US008117763B2

(12) United States Patent
Delneo et al.

(10) Patent No.: US 8,117,763 B2
(45) Date of Patent: Feb. 21, 2012

(54) TAPE RULE AND END HOOK THEREFOR

(75) Inventors: John Delneo, Middletown, CT (US); Vincent Cook, Milford, CT (US); John Murray, Canton, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

(21) Appl. No.: 12/898,352

(22) Filed: Oct. 5, 2010

(65) Prior Publication Data

US 2011/0179664 A1    Jul. 28, 2011

Related U.S. Application Data

(60) Provisional application No. 61/299,224, filed on Jan. 28, 2010.

(51) Int. Cl.
     *G01B 3/10* (2006.01)
(52) U.S. Cl. .......................................... 33/758; 33/770
(58) Field of Classification Search ................... 33/758, 33/768, 770; D10/74
See application file for complete search history.

(56) References Cited

U.S. PATENT DOCUMENTS

| | | | |
|---|---|---|---|
| 14,947 A | 5/1856 | Buck et al. |
| 2,574,272 A | 11/1951 | McCully |
| 5,010,657 A | 4/1991 | Knapp |
| D333,628 S | 3/1993 | Piotrkowski |
| 5,367,785 A | 11/1994 | Benarroch |
| 5,699,623 A | 12/1997 | Lee |
| 5,894,677 A | 4/1999 | Hoffman |
| D409,104 S | 5/1999 | Yang |
| D423,382 S | 4/2000 | Piotrkowski |
| 6,243,964 B1 | 6/2001 | Murray |
| 6,249,986 B1 | 6/2001 | Murray |
| D447,069 S | 8/2001 | Budrow |
| 6,282,808 B1 | 9/2001 | Murray |
| 6,324,769 B1 | 12/2001 | Murray |
| D453,303 S | 2/2002 | Lin |

(Continued)

FOREIGN PATENT DOCUMENTS

FR     1352232     2/1964

(Continued)

OTHER PUBLICATIONS

Extended Search Report as issued for European Patent Application No. 10196448.4, dated Jun. 22, 2011.

(Continued)

*Primary Examiner* — G. Bradley Bennett
(74) *Attorney, Agent, or Firm* — Pillsbury Winthrop Shaw Pittman LLP

(57) ABSTRACT

A rule assembly includes a housing, a reel rotatably mounted in the housing, and an elongated blade having an end hook member on a free end thereof. The end hook member includes a mounting portion having a length dimension and a top surface area and a hook portion having a width dimension and a front surface area, where a ratio of the width dimension of the hook portion to the length dimension of the mounting portion is greater than or equal to 1, a ratio of the front surface area of the hook portion to the top surface area of the mounting portion is greater than or equal to 1.1, and at least two-thirds of the mass of the hook portion lies outside a center section that includes one third of the hook portion's width.

25 Claims, 19 Drawing Sheets

U.S. PATENT DOCUMENTS

| | | |
|---|---|---|
| 6,442,863 B1 | 9/2002 | Poineau et al. |
| 6,449,866 B1 | 9/2002 | Murray |
| 6,546,644 B2 | 4/2003 | Poineau et al. |
| 6,568,099 B2 * | 5/2003 | Bergeron .................. 33/770 |
| 6,637,126 B2 | 10/2003 | Balota |
| 6,643,947 B2 | 11/2003 | Murray |
| D486,086 S | 2/2004 | Jueneman |
| 6,691,426 B1 | 2/2004 | Lee et al. |
| 6,796,052 B1 * | 9/2004 | Lin .................. 33/758 |
| 6,804,899 B2 | 10/2004 | Murray |
| 6,892,468 B2 | 5/2005 | Murray |
| 6,931,753 B2 | 8/2005 | Ryals et al. |
| D514,962 S | 2/2006 | Armendariz |
| 7,055,260 B1 | 6/2006 | Hoffman |
| 7,131,215 B2 | 11/2006 | Kang |
| D535,900 S | 1/2007 | McKinney |
| RE39,719 E | 7/2007 | Murray |
| D547,681 S | 7/2007 | Nelson et al. |
| D557,155 S | 12/2007 | Sa'ar |
| 7,490,414 B2 | 2/2009 | Critelli et al. |
| 7,627,958 B2 * | 12/2009 | Tallon et al. .................. 33/768 |
| 7,918,037 B1 * | 4/2011 | Polkhovskiy .................. 33/770 |
| 2002/0073570 A1 | 6/2002 | Conder |
| 2003/0070315 A1 | 4/2003 | Bergeron |
| 2004/0088875 A1 | 5/2004 | Lee et al. |
| 2005/0028396 A1 | 2/2005 | Stauffer et al. |
| 2005/0155244 A1 | 7/2005 | Ryals et al. |
| 2006/0107546 A1 | 5/2006 | Pritchard |
| 2009/0064525 A1 | 3/2009 | Chen |

FOREIGN PATENT DOCUMENTS

| | | |
|---|---|---|
| JP | 57-165644 U | 10/1982 |
| JP | 04-61002 U | 5/1992 |
| JP | 06-35901 U | 5/1994 |
| JP | 10-30901 A | 3/1998 |

OTHER PUBLICATIONS

U.S. Appl. No. 12/898,275, filed Oct. 5, 2010, Delineo et al.

Extended Search Report, including the Search Opinion, as issued for European Patent Application No. 10196447.6, dated Nov. 29, 2011.

* cited by examiner

US 8,117,763 B2

TAPE RULE AND END HOOK THEREFOR

This application relies on the benefit of priority from U.S. Provisional application No. 61/299,224, filed on Jan. 28, 2010, which is incorporated herein by reference in its entirety.

BACKGROUND OF THE INVENTION

Field of the Invention

The present invention relates to rule assemblies.

A typical tape rule assembly includes an elongated thin metal rule blade that is mounted on a reel rotatably disposed within a housing. The rule blade is retracted into the housing for storage by coiling it about the reel. To measure a work-piece, a length of the rule blade is pulled out of the housing to span the distance to be measured and the blade is held against the work-piece so that gradation lines and numbers printed on the blade can be read against a point on the work-piece. To measure a distance between two objects or surfaces, the blade hook at the free end of the blade may be temporarily secured or placed against an object or surface.

The present invention provides improvements over the prior art tape rules and blade hooks.

SUMMARY

One aspect of the invention relates to a rule assembly that includes a housing, a reel rotatably mounted in the housing, and an elongated blade arranged to be wound on the reel and to be extendable through an opening in the housing, the elongated blade having an end hook member on a free end thereof. The end hook member includes a mounting portion and a generally U-shaped hook portion extending from an end of the mounting portion. The mounting portion has a length dimension, and the hook portion has a width dimension. A ratio of the width dimension of the hook portion to the length dimension of the mounting portion is greater than or equal to 1.

Another aspect of the invention relates to a rule assembly that includes a housing, a reel rotatably mounted in the housing, and an elongated blade having an end hook member on a free end thereof. The end hook member includes a mounting portion and a generally U-shaped hook portion extending from an end of the mounting portion. A ratio of the front surface area of the hook portion to the top surface area of the mounting portion is greater than or equal to 1.1.

Another aspect of the invention relates to a rule assembly that includes a housing, a reel rotatably mounted in the housing, and an elongated blade having an end hook member on a free end thereof. The end hook member includes a mounting portion and a hook portion extending from an end of the mounting portion. At least two-thirds of the mass of the hook portion lies outside a center section that comprises one third of the hook portion's width.

Another aspect of the invention relates to a rule assembly that includes a housing, a reel mounted in the housing for rotation about an axis, and an elongated blade arranged to be on the reel and to be extendable through an opening in the housing, the elongated blade having an end hook member on a free end thereof. The end hook includes a mounting portion and a hook portion extending from an end of the mounting portion. The housing has a width dimension along the axis that is larger than a width dimension of the housing near the opening in the housing from where the elongated blade extends. A width dimension of the hook portion of the end hook is greater than the width dimension of the housing near the opening in the housing from where the elongated blade extends.

Another aspect of the invention relates to a rule assembly includes a housing, a reel rotatably mounted in the housing, and an elongated blade arranged to be wound on the reel and to be extendable through an opening in the housing, the elongated blade having an end hook member on a free end thereof. The end hook member includes a mounting portion and a hook portion extending from an end of the mounting portion. At least half of the mass of the hook portion lies above the mounting portion of the end hook member.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the invention, the structural components illustrated herein can be considered drawn to scale. It is to be expressly understood, however, that many other configurations are possible and that the drawings are for the purpose of example, illustration and description only and are not intended as a definition or to limit the scope of the invention. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION OF THE INVENTION

Figure 2:
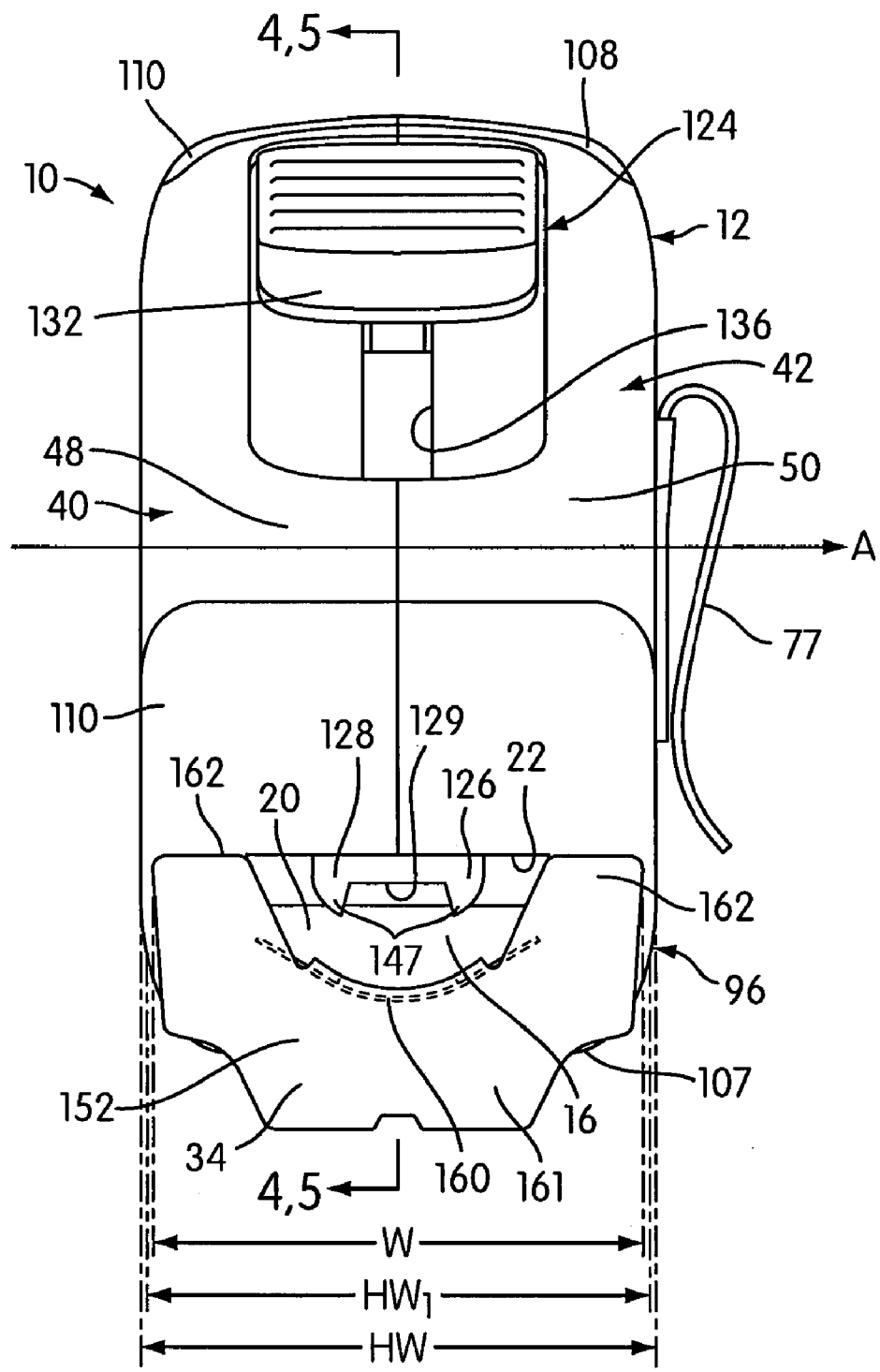
FIG. 2 shows a front of elevational view of the rule assembly in accordance with an embodiment of the present invention.
Figure 3:
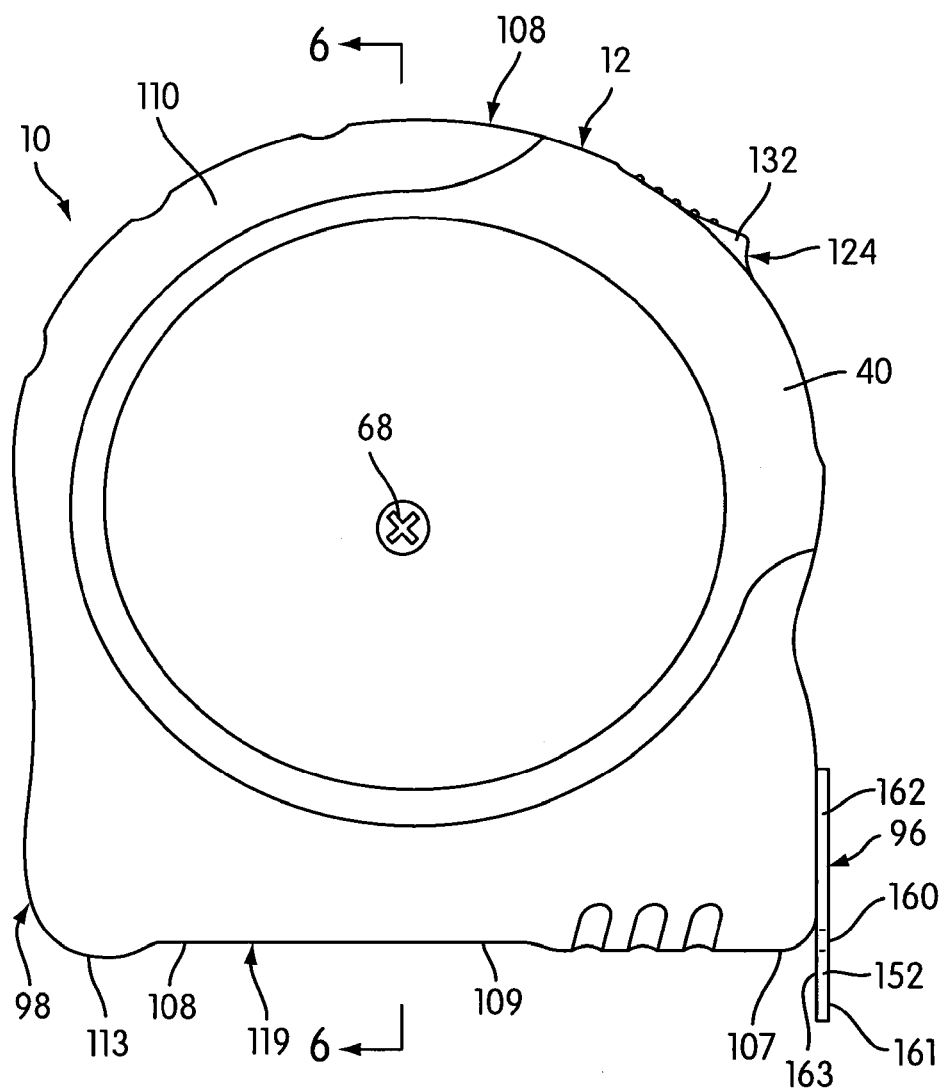
FIG. 3 shows a side of elevational view of the rule assembly in accordance with an embodiment of the present invention.
Figure 4:
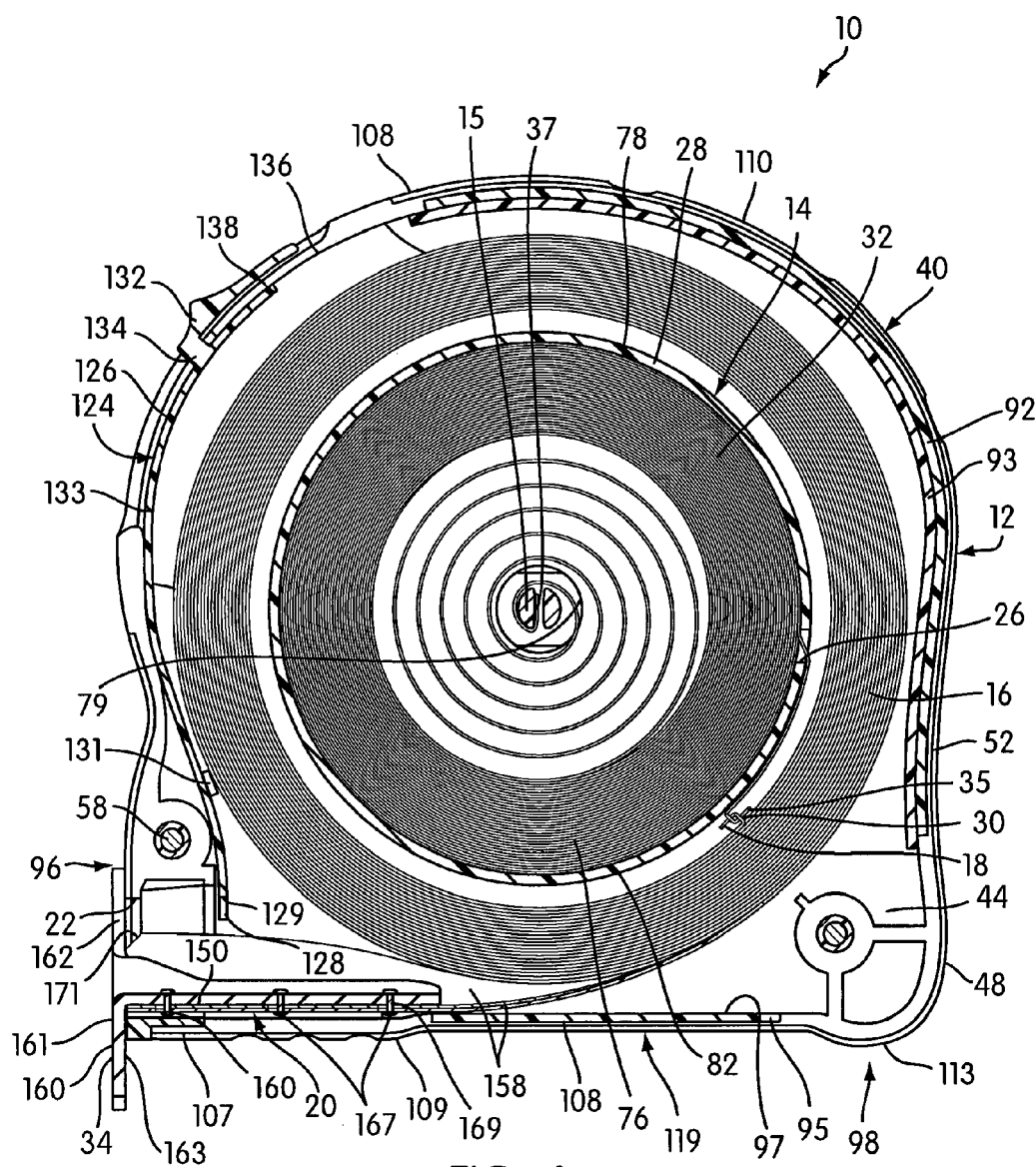
FIG. 4 shows a cross-sectional view of the tape rule assembly taken through the line 4-4 in FIG. 2 showing a blade thereof in a fully retracted configuration in accordance with an embodiment of the present invention.
Figure 5:
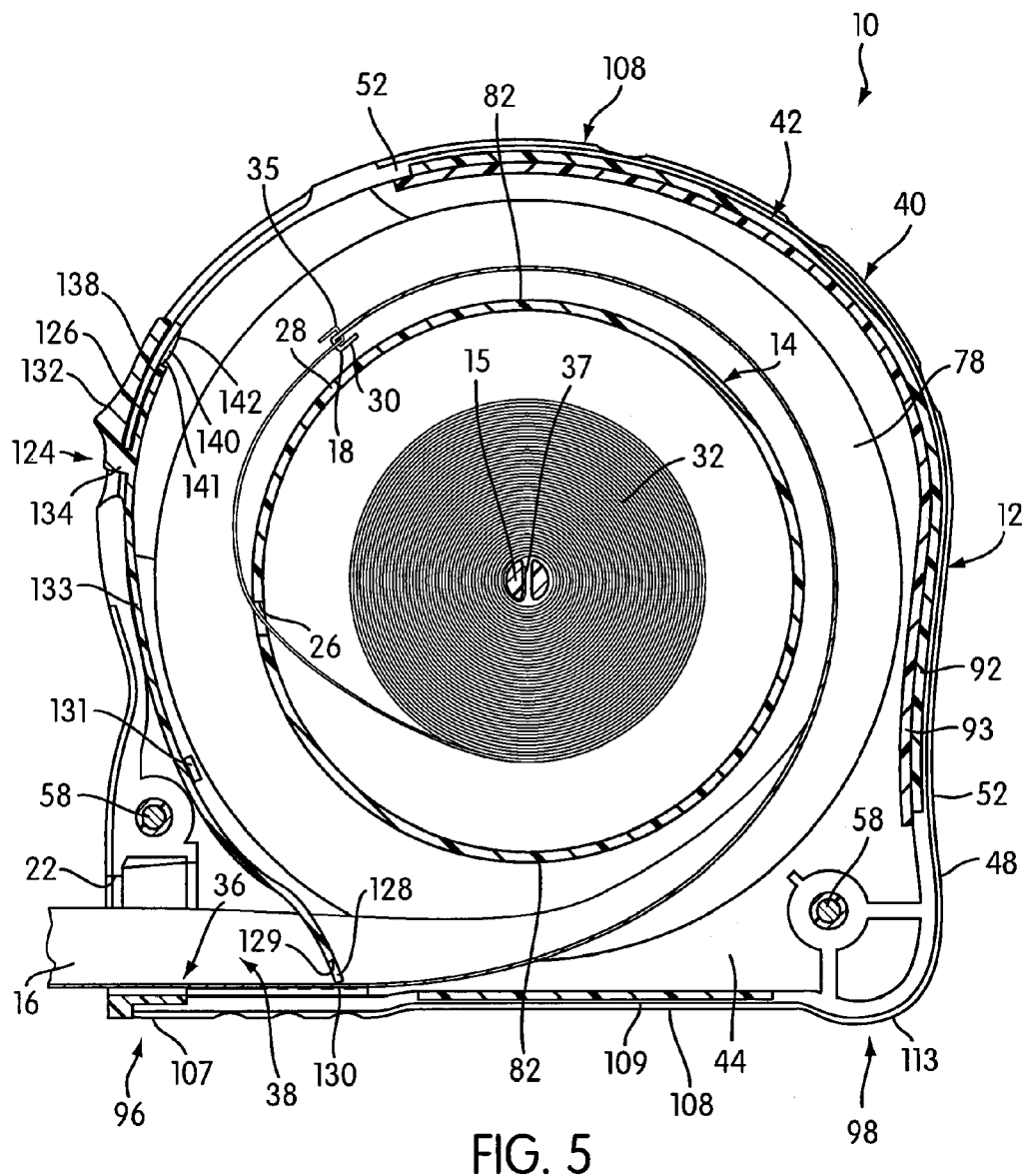
FIG. 5 is a view similar to FIG. 4 except showing the blade in a fully extended configuration in accordance with an embodiment of the present invention.

FIGS. 1-4 show a rule assembly 10 in accordance with an embodiment of the present invention. The rule assembly 10 includes a housing 12, a reel 14 (as shown in FIGS. 4 and 5) rotatably mounted in the housing 12, and an elongated blade 16 having an end hook member 34 on a free end 20 thereof. The elongated blade 16 is arranged to be wound on the reel 14 and to be extendable through an opening 22 in the housing 12.

Figure 6:
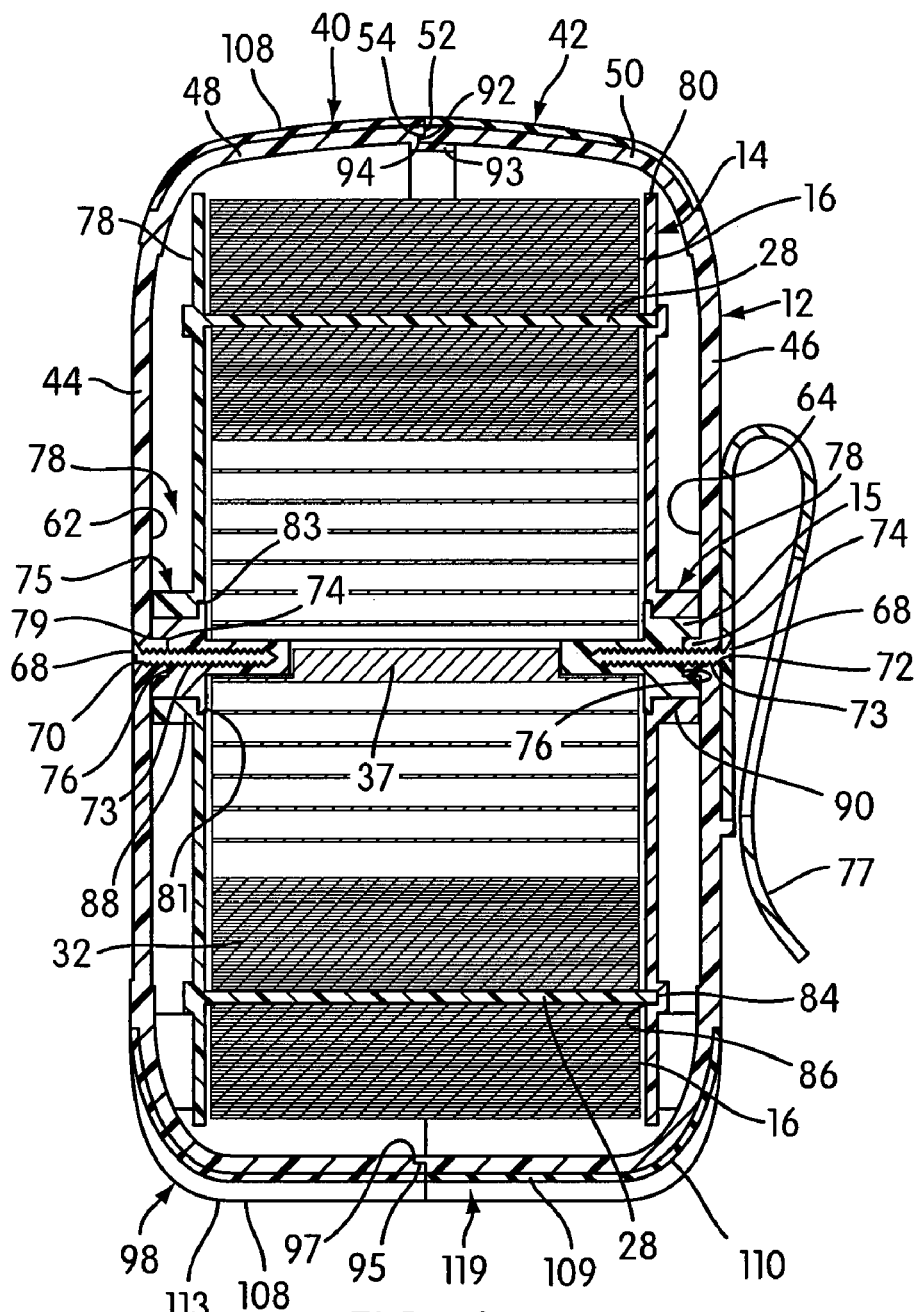
FIG. 6 is a cross-sectional view taken through the line 6-6 in FIG. 3.

In one embodiment, the housing 12 is constructed to easily and comfortably fit in a hand of the user because it optimizes the use of space within the housing 12 to house the blade 16, a coil spring 32 (as shown in FIGS. 4 and 5) and other cooperating components. The details of the internal structure of the housing 12 and the blade 16 mounted therein are shown in FIGS. 4-6. In one embodiment, the housing 12 and the reel 14 are constructed of, for example, a molded plastic material.

As can be clearly seen from FIG. 2, the housing 12 of the rule assembly 10 has an overall width dimension HW larger than a width dimension $HW_1$ of the housing near the opening 22 in the housing 12 from where the elongated blade 16 extends. For example, in one embodiment, the width of housing 12 is bit thinner near the opening 22 (towards a front lower portion of the housing) in comparison with the portion of the housing 12 at a central axis A that passes through the axis of rotation of the reel 14. An overall width dimension W of the hook portion 152 of the end hook 34 is greater than the width dimension $HW_1$ of the housing 12 near the opening 22 in the housing 12 from where the elongated blade 16 extends, and smaller than the overall width dimension HW.

As shown in FIG. 6, the housing 12 includes a pair of cooperating housing members 40, 42. In one embodiment, the housing members 40, 42 are made of, for example, a molded plastic material. Each housing member 40, 42 includes an end wall 44, 46, respectively, having a peripheral wall 48, 50, respectively, extending from a periphery thereof and terminating in a free edge 52, 54, respectively. The pair of cooperating housing members 40, 42 are movable toward one another in an axial direction into cooperating relation to define the housing 12 (where "axial direction" refers to the direction of the axis of rotation of the reel 14 defined by a reel spindle 15).

When the housing members 40, 42 are fixed together in the assembled rule assembly 10, the free edges 52, 54 are interengaged as shown in FIG. 6. It can be thus appreciated that the end walls 44, 46 can be considered the side walls of the assembled housing, the housing having side surfaces 393, a top surface 395, a front surface 397, a back surface 398, and bottom surface 399. A plurality of axially extending bolts 58 extend through one of the housing members 42 and threadedly engage the other housing member 40 at spaced positions adjacent the peripheral walls 48, 50. The housing members 40, 42 are also fixed together by the threaded engagement of bolts 68 with the fixed reel spindle 15. The axially extending spindle 15 is fixed at a central portion of the housing 12. In one embodiment, the fixed spindle 15 has a noncircular interengaging recess-projection connection (shown in FIG. 6 and described below) at each end thereof generally with a central interior region 62, 64, respectively, of the end walls 44, 46 of the housing 12. Each end of the fixed spindle 15 is interiorly threaded to threadedly receive the bolts 68 therein. The bolts 68 extend through central holes 70, 72 formed in the respective adjacent end walls 44, 46 of the housing 12 and threadedly engage internal threading 73 in each end of the spindle 15. Each bolt 68 extends through a recess-projection connection 75, when each bolt 68 is disposed in a respective central hole 70, 72 and threaded interior 73. A clip 77 is secured to one side of the housing 12 by one of the bolts 68. The clip 77 is generally used to attach the rule assembly 10 to the belt of a user, or other attachment point. In one embodiment, the belt clip 77 is made from, for example, a metal material.

In one embodiment, the spindle 15 is constructed of, for example, a molded plastic material or a nylon material. The construction of the recess-projection connections 75 between the ends of the spindle 15 and the walls 44, 46 is shown in cross-section in FIG. 6. Each recess-projection connection 75 is identical. In one embodiment, projections 74 having exterior noncircular cross-sections are integrally formed on the walls 44, 46 and are received within recesses 76 having complementary non-circular interior cross-sections formed on each end of the spindle 15. The noncircular interior and exterior cross-sections cooperate to prevent rotation of the spindle 15 with respect to the housing 12 when the ends of the spindle 15 are mounted on the projections 74 in the assembled rule assembly 10. Each end of the spindle 15 extends through a hole 79 of circular cross-section formed in opposite sides of the reel 14. The portions of the spindle 15 that extend through the holes 79 in the reel 14 have circular exterior cross sections. A flange 81 on the spindle 15 engages an annular groove 83 in the reel 14 surrounding the hole 79 to guide the rotation of the reel on the spindle. Thus, the reel 14 is rotatably mounted on the spindle 15 for bi-directional rotational movement of the reel with respect to the housing 12. As shown in FIGS. 4 and 6, the spindle 15 is internally slotted to receive the one longitudinal end 37 of the spring 32 to thereby secure the one end 37 of the spring 32 to the spindle 15.

The reel 14 includes two reel members 78, 80 (FIG. 6). In one embodiment, the reel 14 is made from, for example, a molded plastic material. The reel member 78 includes a integral cylindrical wall portion 28 about which the blade 16 is wound. In one embodiment, the reel member 80 is disk shaped. Each reel member 78, 80 includes an outwardly extending cylindrical wall portion 88, 90, respectively, formed around the hole 79. An annular edge portion 84 on the wall portion 82 is received within an annular groove 86 formed within the reel member 80 to help hold the reel 14 together. The abutting engagement of the wall portions 88, 90 on the reel 14 with the end walls 44, 46 of the housing 12 maintain the edge portion 84 within the groove 86 in the assembled rule assembly 10.

The housing members 40, 42 include portions along the abutting free edges thereof 52, 54, respectively, of tongue and groove construction (FIG. 6) to help secure the molded housing members 40, 42 of the assembled rule assembly 10 together. In one embodiment, at a top portion of the housing 12, a wall portion 92 formed on edge 54 is received within a groove 94 formed along a portion of the edge 52; and an integral wall portion 93 formed on edge 52 is disposed in underlying, abutting relation to wall portion 50 of the housing member 44. At a bottom portion of the housing 12, a wall portion 95 formed along a length of edge 54 is received within a recess 97 formed on a portion of the wall portion 48 of housing member 40.

When viewed from the side elevational view, the housing 12 includes only two corner portions (see FIG. 4, for example) 96, 98. One corner 96 is adjacent the housing opening 22 and the other corner portion 98 is at an opposite bottom end of the housing 12. The two bolts 58 are positioned in the two corner portions 96, 98, respectively, of the housing 12. Thus, it can be appreciated that the housing 12 is secured together using threaded fasteners in only three locations (from the point of view of one looking at the side elevational view of, for example, FIG. 4): at the opposite corners 96, 98 (bolts 58) at the bottom portion of the housing 12 and in the center of the housing 12 (bolts 68). This use of the bolts 68 on opposite ends of the reel spindle 15 allows the housing 12 to be secured together without using any bolts in a peripheral top portion or portions of the housing 12.

As shown in FIGS. 3-4, because the housing 12 does not require bolts in the upper periphery of the housing 12, the top portion 108 of the housing 12 can be made to have a relatively arcuate profile (FIG. 2, for example) that generally conforms to the profile of the reel 14, thus minimizing the footprint of the housing 12, eliminating corners in the upper portion of the housing 12 and providing a comfortable curved top surface to receive the palm of a user's hand. This arc-shaped upper surface of the housing 12 also increases impact resistance of the housing 12 in case the assembly 10 is dropped.

A peripheral portion of housing 12 is provided with a coating 110 around the gripped portion of the housing 12 to provide increased frictional engagement between the housing 12 and a user's hand and to provide a relatively soft comfortable surface for the user's hand. In one embodiment, the coating 110 is made from, for example, a rubber-like material.

The housing 12 includes a bottom wall 109 (FIGS. 4-5) having an exterior portion 107 at an end position adjacent the housing opening 22 which projects below an exterior surface portion 108 extending therefrom toward an opposite end 113 of the bottom wall 109 to provide a finger grip enhancing configuration 119 for a gripping hand of the user. In the illustrated embodiment, the bottom wall 109 (FIGS. 3-4) has the forward end portion 107 disposed adjacent the housing opening 22 and the rearward end portion 113 at the opposite end of the bottom wall 109. The portion 108 of the wall 109 therebetween is generally recessed to provide the finger grip enhancing configuration 119 for the gripping hand of the user. In one embodiment, this recessed area or gripping area 119 on the bottom of the housing 12 is covered with, for example, the overmolded rubber material or a rubber-like polymeric material. It can thus be appreciated that the housing 12 is constructed to be easily held in one hand of a user such that the user's fingers engage the finger grip enhancing portion 119 and the user's palm and thumb are generally in overlying relation with a top portion of the housing 12.

Figure 1:
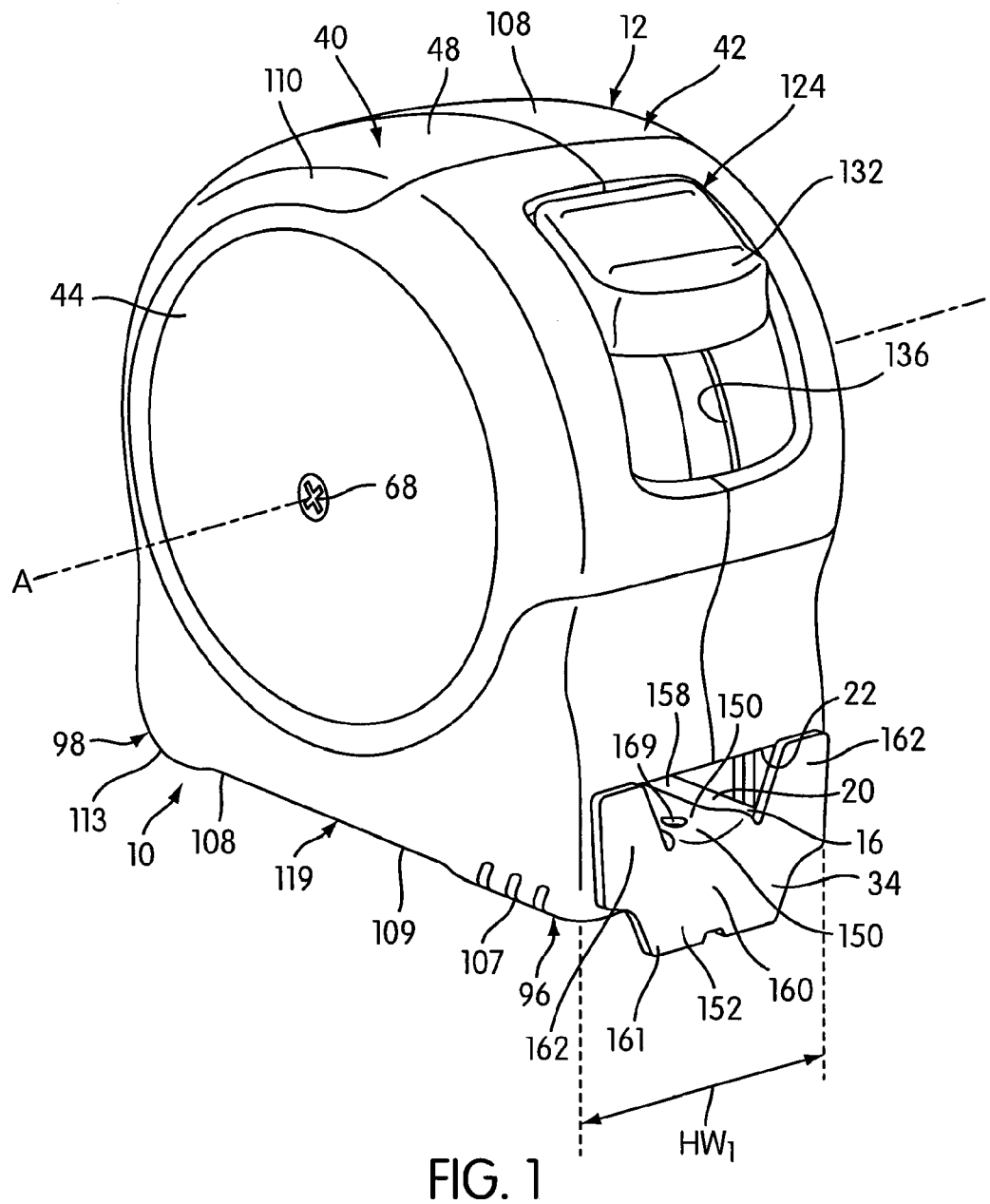
FIG. 1 shows a perspective view of a rule assembly in accordance with an embodiment of the present invention.

In one embodiment, a holding assembly 124 is constructed and arranged to be manually actuated to hold the blade 16 in any position of extension outwardly of the housing opening 22 and to release the blade 16 from any position in which it is held. The structure and operation of the holding assembly 124 is best appreciated from a comparison of FIGS. 4-5. The holding assembly 124 includes a holding member 126 mounted on the housing 12 for movement in opposite directions between a normally inoperative position (FIG. 4) and a holding position (FIG. 5). It can be appreciated that the blade holding member 126 is an arcuate member that is movable along an arcuate path between the two positions as aforesaid. The holding member 126 has an interior free end portion 128 that is movable into wedging engagement with the tangentially extending portion of the blade 16 to engage and hold the blade against an interior holding structure 130 (FIG. 5) on the housing 12 when the holding member 126 is in its holding position. The free end portion 128 includes a central recess 129 (FIG. 2, for example) that is described in detail below. The holding member 126 has an exterior thumb engaging portion 132 configured to be moved digitally to selectively move the holding member 126 from its normally inoperative position and its holding position. The exterior thumb engaging portion 132 is shown in FIGS. 1-2.

In one embodiment, the holding member 126 is an integral structure made of, for example, an appropriate durable flexible plastic material. The thumb engaging portion 132 is connected by an integral outwardly extending neck portion 134 to an elongated arcuate flexible body portion 133 that terminates in the interior free end 128. The outwardly extending portion 134 is slidably held within and guided by a slot 136 formed within a front part of housing 12 by the members 40, 42. The movement of a lower portion of the holding member 126 is guided by a pair of tabs 131 integrally formed on respective housing members 40, 42 (only one tab is shown in the figures). An integral locking structure 138 on the holding member 126 engages holding structure 140 (FIG. 5) integrally formed on the housing 12 to releasably lock the holding member 126 in the holding position in wedging engagement with the blade 16.

In one embodiment, to lock the blade 16 in a given position of extension, the user (while holding the blade 16 outwardly of the housing 12 against the spring force of the coil spring 32) slides the thumb engaging portion 132 downwardly with respective to the housing 12 causing the locking structure 138 to slide over a ramped surface 142 on the holding structure 140 and causing the free end 128 to move in a locking direction with respect to the blade 16. The flexible plastic locking structure 138 bends resiliently outwardly slightly as it passes over the holding structure 140. After the free end 128 contacts the blade 16, continued movement of the thumb engaging portion 132 in the locking (downward) direction thereafter wedges the free end 128 of the flexible body portion 133 against blade 16 to hold the blade 16 in place against the spring force of the coil spring 32 and moves the locking structure 138 into abutting engagement with a locking surface 141 on the holding structure 140. The holding member flexes slightly as the free end 128 is wedged against the blade 16. The abutting engagement between the locking structure 138 and the locking surface 141 locks the holding member 126 in its holding position. It can be understood from FIG. 5 that the blade 16 is held in an extended position (against the spring force of the coil spring 32) between the free end 128 of the body portion 133 and the interior holding structure 130 by the downward force exerted by the wedged body portion 133. The interior holding structure 130 (not visible in detail) is a series of longitudinally spaced, transversely extending ribs that are constructed and arranged to support the convex side of the blade 16. When viewed from the point of view of FIG. 5 (i.e., on a transversely directed line of sight), the top surfaces (not visible in the FIGS.) of the ribs cooperate to provide a generally downwardly sloped support (in a direction toward the opening 22) for the blade 16; and when viewed from the front, (i.e., on a longitudinally directed line of sight) the top surfaces (not visible in the figures) of each rib of the interior holding structure 130 are transversely spaced in a concave array to receive and support the convex side of the blade.

To release the blade 16, the user pulls upwardly on the thumb engaging portion 132 which causes the locking structure 138 on the plastic holding member 126 to move resiliently outwardly and past the locking surface 141 to release the holding member 126 from engagement with a blade 16. The holding member 126 resiliently returns to its normal arcuate shape. It can be appreciated from FIG. 2 that the recess 129 on the free end 128 of the holding member 126 defines two transversely spaced teeth 147 which have spaced arcuate side surfaces 144 sized to conform to the concave surface of the blade 16 to hold the same in locked position.

It can be understood that the use of the holding member 126 when a, measurement is being taken is optional. When taking a measurement, the user typically holds the housing 12 in one hand and manually pulls the blade 16 out of the housing 12 with the other hand. When a sufficient length of blade 16 has been withdrawn from the housing 12, the user can lock the blade 16 with respect to the housing 12 using the holding member 126 to prevent the blade 16 from retracting back into the housing 12 (under the spring force of spring 32) when the user releases the blade 12. When the measurement has been taken, the user simply releases the holding member 126 from holding engagement with the blade 16 by moving the free end 128 thereof out of wedging engagement with the blade 16 in the manner described above. If the holding member 126 is not used during the taking of a measurement, the user can simply hold the blade 16 with his other hand while the measurement is being taken or, alternatively, the hook member 34 can be placed in hooking engagement with the work-piece to hold the blade 16 outwardly of the housing 12 in a controlled and steady manner against the spring force of spring 32 while the measurement is being taken.

When the blade 16 is released after taking the measurement, the spring 32 rotates the reel 14 with respect to the housing 12 in a blade-winding direction to wind the blade 16 around the reel 14. A relatively short free end portion of the blade 16 has a clear film 158 of plastic material adhered to the concave side thereof (FIG. 11) to protect the blade 16 while the same is out of the housing 12 and while the blade 16 is being retracted under the spring force of the spring 32 back into the housing 12. In one embodiment, the film is made of polyurethane and is adhered to the blade by an acrylic adhesive. It is also contemplated to use polyester to construct the film. In one embodiment, the film has a thickness dimension of approximately 0.0005 inches. It is within the scope of the invention to apply this film to the blade of any known tape rule assembly.

The free end 20 of the blade 16 is frequently handled by the user and this handling can over time cause the numbering and markings on the concave side of the blade 16 to wear off or become difficult to read. The film 158 prevents this wear because it covers the numbering and markings on the free end of the blade and thereby protects the same from being worn off.

In one embodiment, the blade 16 is formed of a ribbon of metal (e.g., the metal being steel), and the top concave surface of the blade is printed with measuring lines and digits (not shown) for measuring lengths and distances. A first longitudinal end 18 of the blade 16 is connected to a first longitudinal end 35 of the coil spring 32 and the second longitudinal free end 20 of the blade 16 extends generally outwardly of the reel 14. The blade 16 is constructed and arranged with respect to the housing 12 to extend generally from a position tangential of the reel 14 outwardly through the opening 22 provided in the housing 12 (as shown, for example, in FIG. 4).

The reel 14 is mounted in the housing 12 by the reel spindle 15 that is secured within the housing 12. In one embodiment, the reel 14 is made of a molded plastic and is provided with a slot or an opening 26 in a central cylindrical wall portion 28 thereof. The one end 18 of the blade 16 terminates in a hook-like structure 30 that engages the first longitudinal end 35 of the coil spring 32 to connect the end 18 of the blade 16 to the coil spring 32 (FIGS. 4, 5).

The coil spring 32 is constructed and arranged between the housing 12 and the reel 14 to rotate the reel 14 with respect to the housing 12 in a direction to wind the elongated blade 16 about the reel when the blade 16 is extending outwardly of the housing opening 22. The coil spring 32 is generally enclosed within the central wall portion 28 of the reel 14 (FIGS. 4-6). The first longitudinal end 35 of the coil spring 32 extends through the opening 26 and engages the first longitudinal end 18 of the blade 16, and a second longitudinal end 37 of the coil spring 32 hookingly engages the spindle 15. The spindle 15 is rigidly mounted to the housing 12 in a manner described above. In one embodiment, the spring 32 is a thin, flat ribbon of metal (e.g., the metal being steel).

The blade 16 is generally movable between a fully retracted position outwardly of the housing 12 to a fully extended position. The fully retracted position of the blade 16 is shown in FIG. 4 and the fully extended position of the blade is shown (in fragmentary view) in FIG. 5. It can be appreciated from a comparison of FIG. 4 and FIG. 5 that as the blade is unwound from the reel 14, the coil spring 32 is wound around the rigidly fixed spindle 15. This winding of the spring around the spindle stores energy in the spring to provide spring powered rewinding of the blade 16 around the reel 14 when the extended blade is released.

The blade 16 may be constructed of a ribbon of sheet metal that is shaped during the manufacturing to have a normal or memory configuration that has a generally arcuate or concavo-convex transverse cross-section. When a portion of the blade 16 is wound about the reel 14, the wound portion has a flat transverse cross-section and the wound layers of the coiled blade provide the wound blade with an abutting volute coil configuration. In other words, when the blade 16 is wound around the reel 14, it has the flat cross-section and when the blade 16 is withdrawn from the housing 12 to measure an object, it returns to the concavo-convex cross-section. Thus, the coil spring 32 is constructed and arranged between the housing 12 and the reel 14 to rotate the reel 14 about the spindle 15 with respect to the housing 12 in a direction to wind up the elongated blade 16 when extending outwardly of the housing opening 22 in a normal concavo-convex cross-sectional configuration onto the reel 14 in an abutting volute coil formation in a flattened cross-sectional configuration. The concavo-convex cross-section provides the extended blade with rigidity and maintains the blade essentially straight in the longitudinal direction.

The concavo-convex cross-section of the blade 16 generally provides the unsupported blade 16 with blade standout. The concavo-convex cross-section of the blade 16 generally includes an arcuate central section 36 and integral end sections 38. In various embodiments, the concavo-convex cross-sectional configuration of the blade 16 can be of the type described in commonly assigned U.S. Pat. No. 6,324,769, that is hereby incorporated by reference in its entirety.

FIGS. 7-12 show different views of the end hook member 34. As shown in FIGS. 7-12, the end hook member 34 includes a mounting portion 150 and a hook portion 152 bent at a generally right angle from an end of the mounting portion 150. In one embodiment, the end hook member 34 is formed of, for example, a sheet metal material of a predetermined thickness.

In one embodiment, the hook portion 152 has a generally U-shaped configuration. In one embodiment, the mounting portion 150 has a generally concavo-convex configuration. In another embodiment, the mounting portion 150 has a generally flat configuration.

As shown in FIGS. 1-4, the end hook member 34 is mounted on the free end 20 of the blade 16 with the mounting portion 150 thereof secured in engagement with a concave (upper) side of the free end 20 of the blade 16 and in overlying relation thereto.

In one embodiment, the connection between the free end 20 of the blade and the mounting portion 150 may permit limiting sliding movement therebetween.

Figure 9:
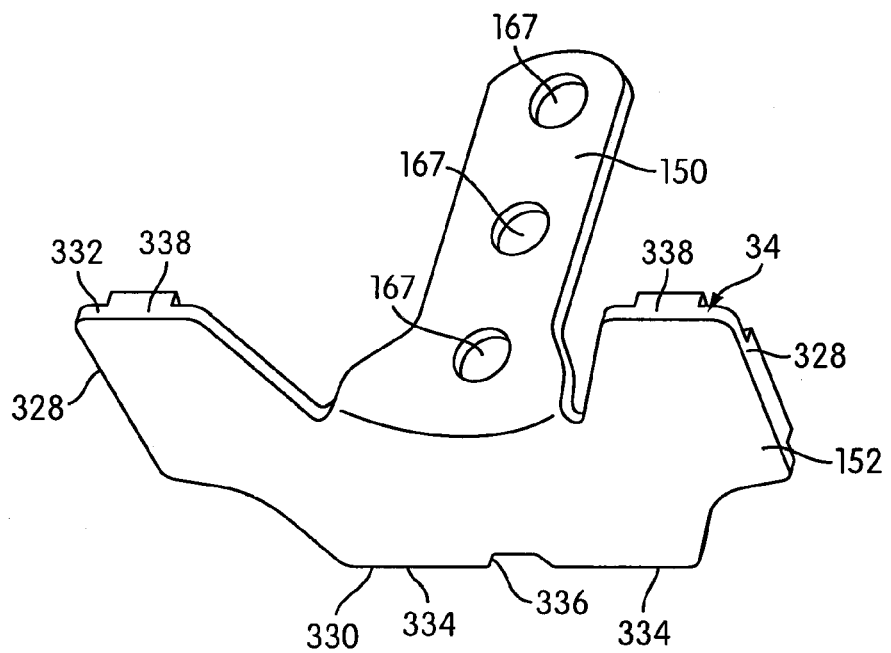
FIG. 9 shows another perspective view of the end hook in accordance with an embodiment of the present invention.
Figure 11:
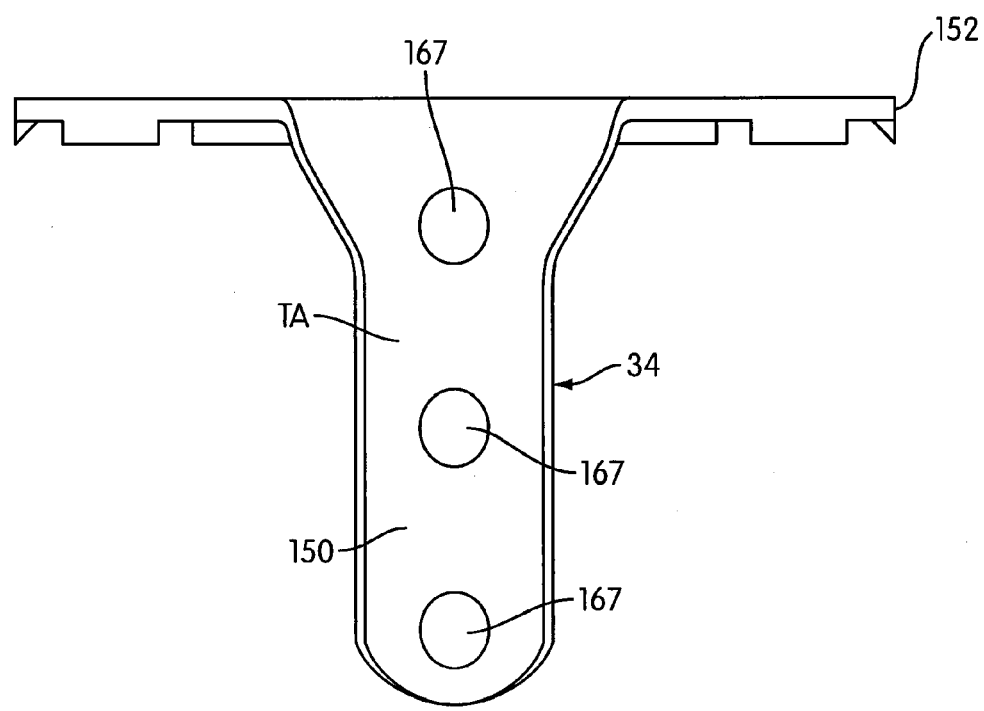
FIG. 11 shows a top view of the end hook in accordance with an embodiment of the present invention.

Specifically, as shown in FIGS. 4, 9 and 11, the mounting portion 150 is provided with large holes 167 (FIGS. 4, 9 and 11) and a plurality of rivets 169 extend through the holes 167 to slidably mount the end hook member 34 to the blade 16 for limited longitudinal relative movement between the end hook member 34 and the blade 16 (i.e., the diameter of each hole 167 is greater than the diameter of the associated rivet 169 by an amount approximately equal to the desired amount of hook movement). The limited sliding engagement allows the blade 16 to be measured externally from an external surface 161 of the U-shaped hook portion 152 or internally from an internal surface 163 of the U-shaped hook portion 152. In other words, the sliding movement of the end hook member 34 allows an accurate measurement to be taken with either surface 161 or 163 in abutting relation with the work-piece; the hook member 34 slides longitudinally with respect to the blade 16 a distance approximately equal to the thickness of the hook portion 152 (where the thickness is measured from surface 161 to surface 163) so that a measurement taken with either surface 161 or 163 in abutting engagement with the work-piece will yield an accurate measurement.

Figure 7:
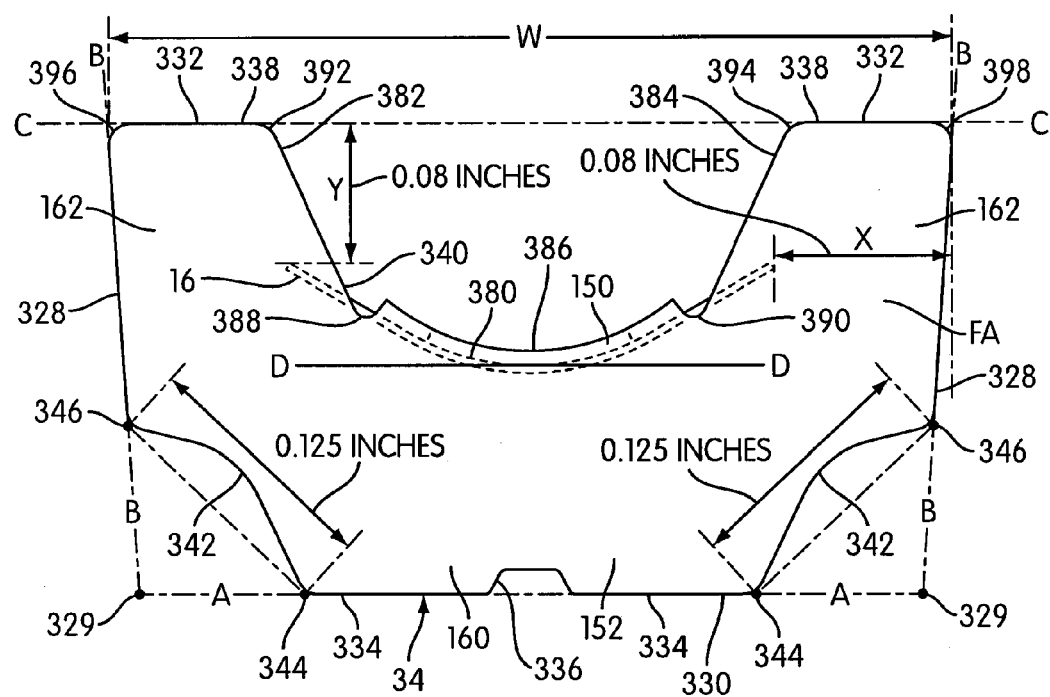
FIG. 7 shows a front view of an end hook in accordance with an embodiment of the present invention.
Figure 8:
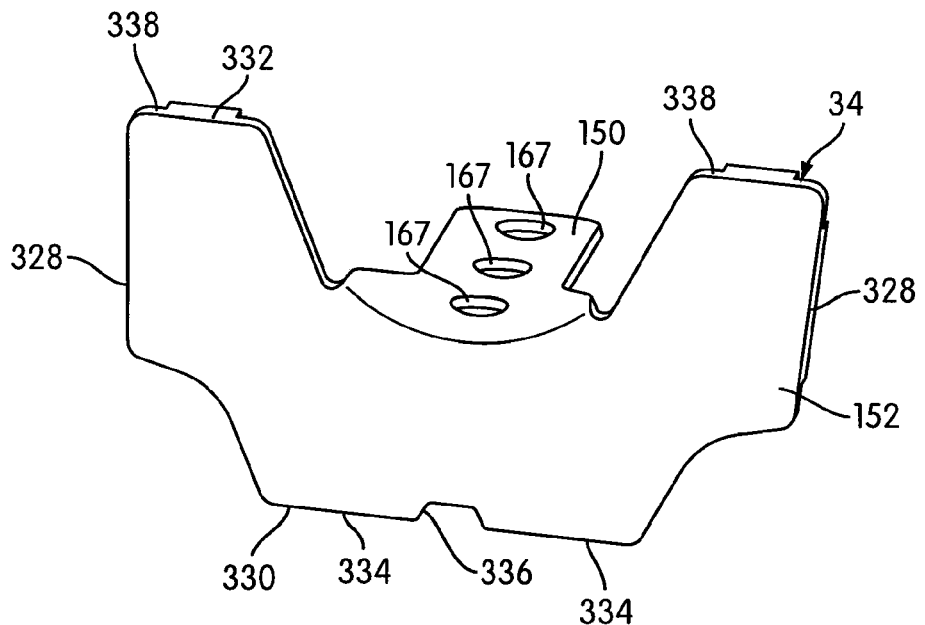
FIG. 8 shows a perspective view of the end hook in accordance with an embodiment of the present invention.

In one embodiment, the distribution of the mass in the hook portion 152 is such that at least half of the mass of the hook portion 152 lies above an upper surface 380 (as shown in FIG. 7) of the elongated blade 16. In other words, in one embodiment, a larger portion of the mass of the hook portion 152 (and the mounting portion 150) is above an axis D-D (as shown in FIG. 7) passing through the upper surface 380 (as shown in FIG. 7) of the blade 16. In another embodiment, the distribution of the mass in the hook portion 152 is such that at least half of the mass of the hook portion 152 lies above the mounting portion 150 of the end hook member 34. These configurations of the end hook member 34 allows for increased top catching capability of the end hook member 34. In one embodiment, the top catching capability of the end hook member 34 generally refers to the ability of a portion the end hook 34 to hookingly engage with a work-piece to facilitate extension of the blade 16 and to temporarily secure the blade to the work-piece while a measurement is being taken. In such an embodiment, the portion of the end hook 34 may be a) located above the blade 16 and b) located above and to the side of the blade 16.

In one embodiment, the U-shaped hook portion 152 including a bight section 160 and spaced leg sections 162 extending upwardly from the bight section 160. In one embodiment, the bight section 160 of the U-shaped hook portion 152 is configured to extend downwardly, below a convex side of the free end 20 of the blade 16. The bight section 160 of the hook portion 152 of the hook member 34 provides an under-catch structure that can hookingly engage a work-piece to facilitate extension of the blade 16 and to temporarily secure the blade to the work-piece while a measurement is being taken.

In one embodiment, as shown in FIG. 7, the leg sections 162 extend laterally outwardly beyond the longitudinally extending edges of the blade 16 to provide a side catch surface on each side of the blade 16 that can be used to hook the blade 16 to an object or work-piece. The side catch structure provided by the legs 162 can function to secure the free end 20 of the blade 16 during a measurement. The side catch structure provided by the leg sections 162 also allow the blade 16 to be easily and steadily held in a position relative to a surface of the work-piece, thereby allowing a longitudinally extending edge of the blade 16 to be held against the work-piece. In one embodiment, when the convex side of the blade 16 is against the work-piece, the longitudinal edges are normally spaced from the surface because of the concavo-convex cross-section of the blade 16. The side catch provided by the legs 162 of the hook member 34 can be hooked over an edge of the work-piece to allow the user to hold steadily a longitudinal edge of the blade 16 very close to or directly against the work-piece when the convex side of the blade 16 is against the work-piece, which facilitates reading a measurement.

In one embodiment, as shown in FIG. 7, the leg sections 162 extend laterally beyond transversely spaced corners 171 of the free end 20 of the blade 16. In the illustrated embodiment, as shown in FIG. 7, the side surface 328 of leg sections 162 extend (at its laterally outermost point, when taking a vertical or plumb tangent line to the side surface 328 as shown) laterally beyond transversely spaced corners 171 of the free end 20 of the blade 16 by a distance of X (shown in FIG. 7). In one embodiment, the leg sections 162 extend laterally beyond transversely spaced corners 171 (as shown in FIG. 4) of the free end 20 of the blade 16 by at least a distance of 0.08 inches (i.e., by a distance equal to or greater than 0.08 inches). In one embodiment, as seen in FIG. 4, the corners 171 at the front edge of the blade are chamfered or angled.

In one embodiment, as shown in FIG. 7, the upper portions of the leg sections 162 extend generally upwardly and outwardly above the concave side of the blade 16 to provide structure above the concave surface of the blade 16 to hookingly engage the work-piece to facilitate extension of the blade 16 and to hold the free end 20 of the blade 16 while a measurement is being read. For example, the blade 16 can be placed against a work-piece such that the concave side of the blade 16 is facing the work-piece and such that the opposite longitudinal edges of the blade 16 abut a surface on the work-piece at a point where they measurement is to be read. When the blade 16 is in this position, the upwardly extending portions of the legs 162 on the hook member 34 can be used to hold the free end 20 of the blade 16 against the work-piece.

In one embodiment, the leg sections 162 extend upwardly above both the mounting portion 150 and the spaced corners 171 of the free end 20 of the blade 16. In the illustrated embodiment, as shown in FIG. 7, the upper surface of leg sections 162 extend upwardly above transversely spaced corners 171 of the free end 20 of the blade 16 by a distance of Y, at a maximum height as shown. In one embodiment, the leg sections 162 extend upwardly above the spaced corners 171 of the free end 20 of the blade 16 by at least a distance of 0.08 inches (i.e., by a distance equal to or greater than 0.08 inches).

In one embodiment, with a substantial increase in the size and width of the end hook member 34, the end hook member 34 is to be protected from side and corner impacts.

Figure 15B:
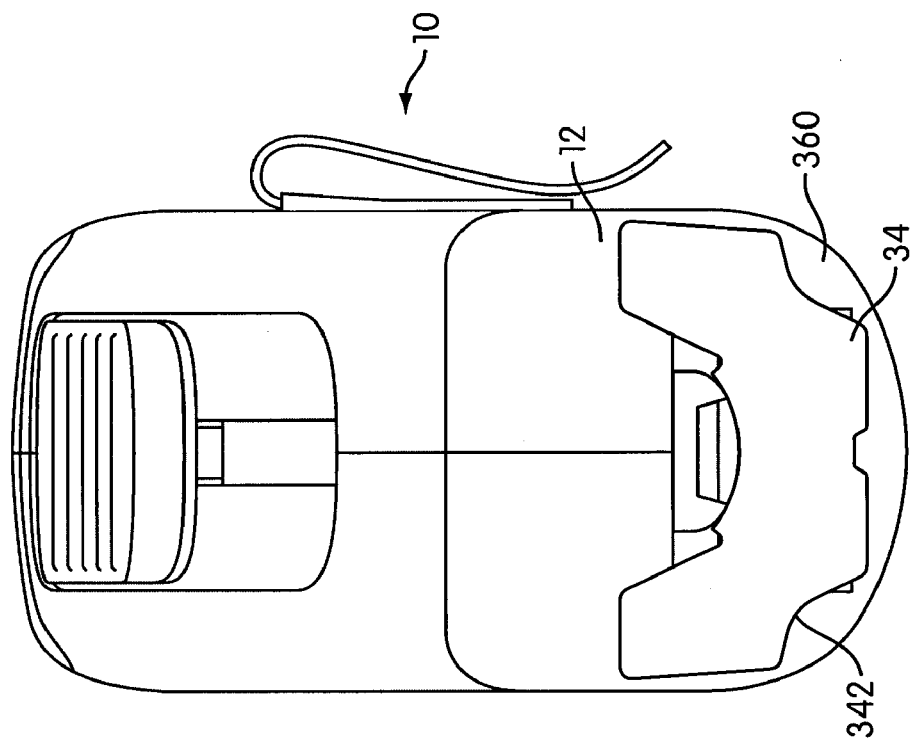
FIG. 15B shows a perspective view of the rule assembly, where lower corner portions of the housing extend beyond recessed surface portions of the hook portion in accordance with an embodiment of the present invention.
Figure 15A:
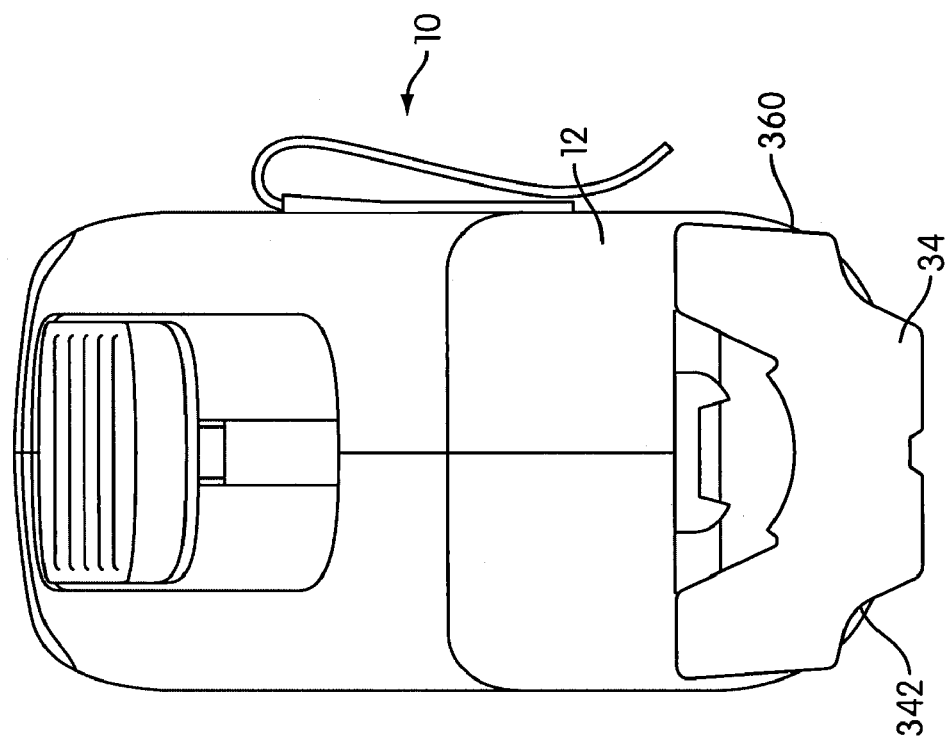
FIG. 15A shows a perspective view of the rule assembly prior to a corner impact in accordance with an embodiment of the present invention.
Figure 16A:
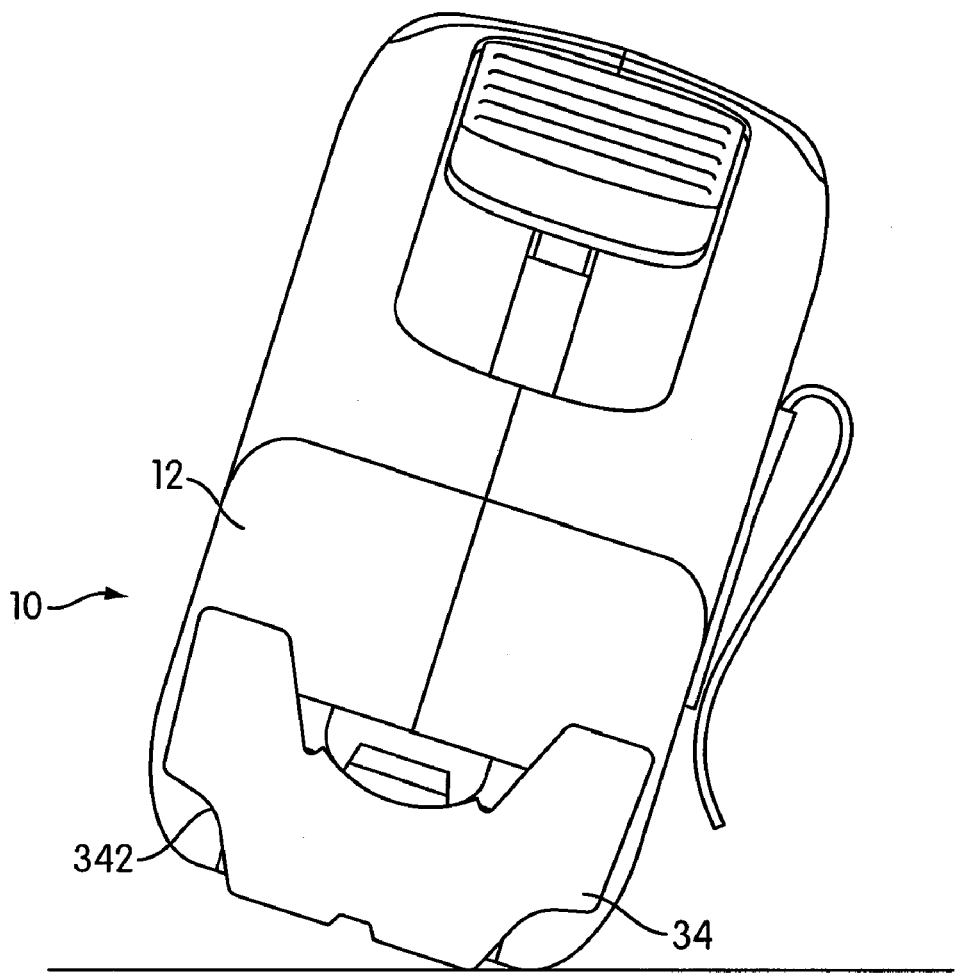
FIG. 16A-B shows a corner impact drop orientation and a side impact drop orientation for the rule assembly in accordance with an embodiment of the present invention.

FIG. 15A shows a front plan view of the rule assembly. As shown in FIG. 15A, at least a portion of forward lower corner portions 360 of the housing 12 are exposed (i.e., extended beyond the notched or recessed edge portions 342 at the lower, opposite ends of the hook portion 152). In one embodiment, the blade 16 (i.e., along the end hook 34 attached to the free end 20 thereof) of the rule assembly 10 is constructed and arranged to be movable from a first position (as shown in FIG. 15A) to a second position (as shown in FIG. 15B) to the end hook 34 upon impact (e.g., the tape rule housing being accidently dropped). In other words, as shown in FIG. 15B, sufficient clearance and/or movability of the blade and end hook 34 parts allows the end hook 34 to be pushed upwards (from its position as shown in FIG. 15A to the position in FIG. 15B) to protect the end hook 34 from bring bent upon impact. In one embodiment, as shown in FIG. 15B, a large portion (i.e., in comparison with FIG. 15a) of the forward lower corner portions 360 of the housing 12 extend beyond the notched or recessed edge portions 342 at the lower, opposite ends of the hook portion 152 upon impact. In other words, in one embodiment, as shown in FIG. 15B, the notches 342 permit a sufficient portion of the forward lower corner portions 360 of the housing 12 to be exposed upon impact to prevent or at least reduce the likelihood of hook portion 152 from being bent/damaged upon impact. In one embodiment, when the rule assembly 10 is dropped in an orientation to have a corner impact (shown in FIG. 16A), the recessed edge portions 342 of the end hook member 34 are constructed and arranged to allow (or provide access to) the lower corner portions 360 of the housing 12 to receive the majority of the force upon a corner impact.

Figure 16B:
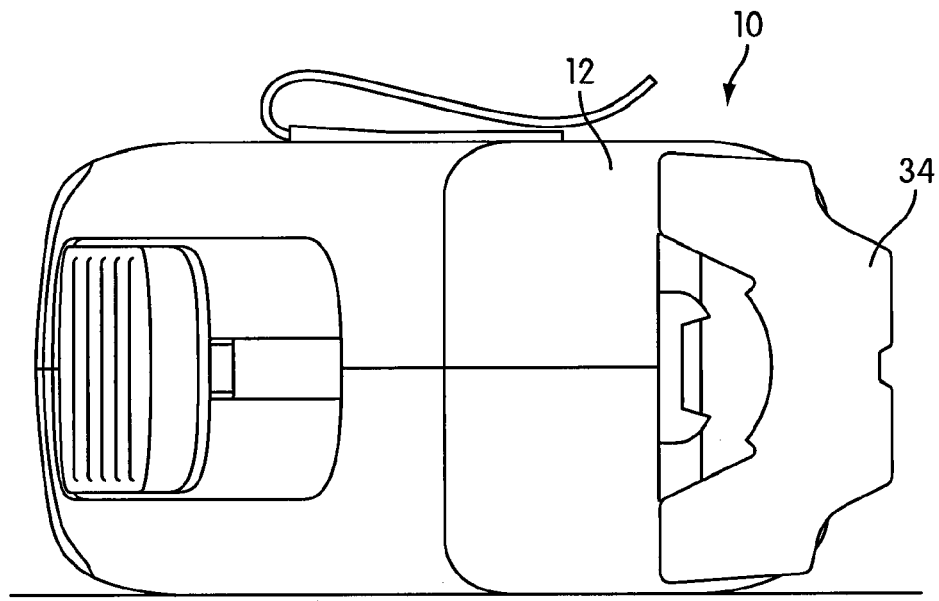

In one embodiment, when the rule assembly 10 is dropped in an orientation to have a side impact (shown in FIG. 16B), the housing 12 of the rule assembly 10 is constructed and arranged to first receive the impact. In one embodiment, during a side impact (shown in FIG. 16B) of the rule assembly 10, the end hook member 34 is protected because an overall width dimension HW (as shown in FIG. 2) of the housing 12 of the rule assembly 10 is wider than the width dimension W (as shown in FIG. 7) of the end hook member 34. In one embodiment, during the side impact (shown in FIG. 16B) of the rule assembly 10, the housing 12 of the rule assembly 10 is constructed and arranged to receive and absorb the impact in order to protect the end hook member 34 from bending due to the side impact (shown in FIG. 16B).

In one embodiment, the end hook member 34 may not contact the ground during a side impact. Specifically, when the rule assembly 10 is dropped in such an orientation (to have a side impact) that the end wall 44 or 46 (as shown in FIG. 6) of the rule assembly 10 generally lies parallel a surface (i.e., ground) on which it impacts (or the central axis A (as shown in FIG. 2) that passes through the axis of rotation of the reel 14 is generally perpendicular to the surface (i.e., ground) on which it impacts), then the end hook member 34 may not contact the ground during a side impact. This is at least in part because the thickness of the housing towards central portions thereof (e.g. along axis A), is such that the hook member 34 is signed and configured such that it will not contact an impact surface that is perpendicular to axis A.

In one embodiment, as shown in FIGS. 7-12, the end hook member 34 includes a pair of generally upwardly extending side edges 328, a generally laterally extending lower edge 330, and a generally laterally extending upper edge 332.

In one embodiment, as shown in FIGS. 7-12, the laterally extending lower edge 330 includes a pair of lowermost surfaces 334 lying along a common line or axis A-A and separated by an upwardly extending groove or notch portion 336. In another embodiment, the laterally extending lower edge 330 including the pair of lowermost surfaces 334 may lie along a curved line, such as a convex line (i.e., instead of the straight line).

In one embodiment, as shown in FIGS. 7-12, each of the upwardly extending side edges 328 extend along a line B-B that forms an angle that is between 85° and 100° with respect to the common line A-A along which the laterally extending lower edge 330 extends.

In one embodiment, as shown in FIGS. 7-12, the laterally extending upper edge 332 includes a pair of uppermost surfaces 338 lying along a common line or axis C-C and separated by an downwardly extending U-shaped portion 340. In another embodiment, the laterally extending upper edge 332 including the pair of uppermost surfaces 338 may lie along a curved line (i.e., instead of the straight line). In one embodiment, the U-shaped portion may include a pair of inwardly sloping edges 382 and 384, as shown in FIG. 7, and a connecting portion 386 constructed and arranged to join the two inwardly sloping edges 382 and 384. In one embodiment, the U-shaped portion 340 may include a pair of notch or groove portions 388 and 390 positioned at the area in which the connecting portion 386 join to the inwardly sloping edges 382 and 384.

In one embodiment, upper inner corners 392 and 394 at which the inwardly sloping edges 382 and 384 join with the laterally extending upper edge 332 are generally rounded or chamfered. In one embodiment, upper outer corners 396 and 398 at which the upwardly extending side edges 328 join with the laterally extending upper edge 332 are generally rounded or chamfered.

In one embodiment, as shown in FIGS. 7-12, the end hook member 34 includes recessed edge portions 342 disposed at corner portions at which the upwardly extending side edges 328 and the laterally extending lower edge 330 intersect. In one embodiment, the recessed edge portions 342 are constructed and arranged to protrude inwardly from a point 329 at which the upwardly extending side edges 328 and the laterally extending lower edge 330 intersect.

In one embodiment, as shown in FIGS. 7-12, the recessed edge portions 342 are constructed and arranged to extend between a first point 344 and a second point 346. In one embodiment, the first point 344 is at the end of the laterally extending lower edge 330 and the second point 346 is at the end of the upwardly extending side edge 328. In one embodiment, the linear distance between the first point 344 and the second point 346 is at least equal to 0.125 inches (i.e., is equal to or greater than 0.125 inches).

In one embodiment, the recessed corner portions 342 constructed and arranged to connect with the upwardly extending side edge 328 at the second point 346 and to connect with the laterally extending lower edge 330 at the first point 344. In one embodiment, corners that lie on the first point 344 and the second point 346 are generally rounded or chamfered.

Figure 12:
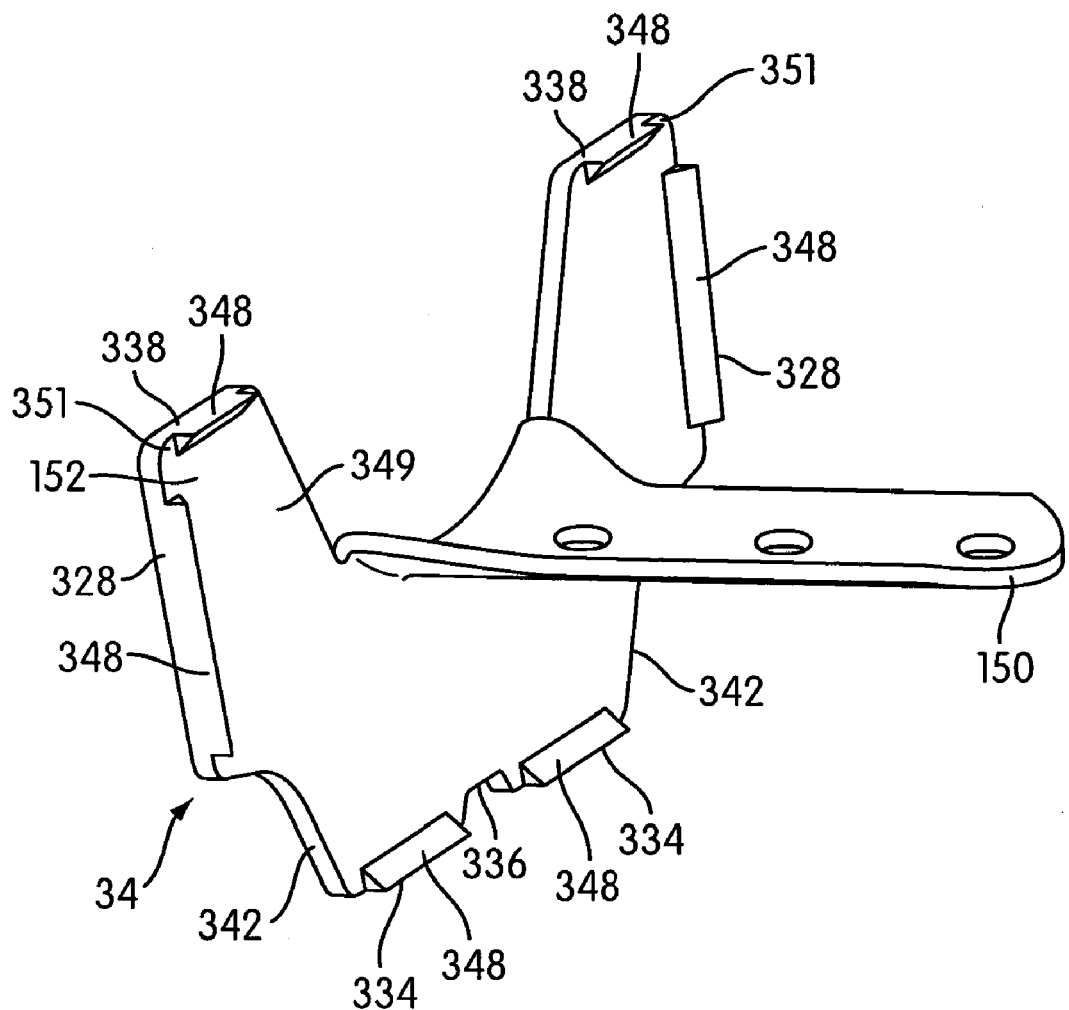
FIG. 12 shows a rear perspective view of the end hook in accordance with an embodiment of the present invention.

As clearly shown in FIG. 12, in one embodiment, the end hook member 34 includes at least a burred portion (e.g., an area of roughness) 348 disposed on a portion of the end hook 34 that is positioned above the elongated blade 20. In one embodiment, the minimum height of the burred portion 348 is at least 0.003 inches from base to peak. In one embodiment, the height of burred portion 348 is between 0.010 to 0.015 inches.

In one embodiment, the burred portions 348 disposed (i.e., in multiple orientations) on the end hook 34 are constructed and arranged to hookingly engage the end hook 34 with the work-piece while a measurement is being read.

In one embodiment, the burred portions 348 disposed on the end hook member 34 are constructed and arranged to provide the end hook member 34 with an extra catching capability (i.e., when using the end hook member 34 to take measurements of a work-piece that is in an orientation other than directly below the blade 16). Also, in one embodiment, by having an end hook member 34 with burred portions 348 in multiple orientations accuracy is maintained.

In one embodiment, the burred portions 348 are disposed in multiple orientations on the end hook 34. In one embodiment, the burred portions 348 are disposed on the uppermost surfaces 338 of the leg sections 162. In one embodiment, the burred portions 348 are disposed on the upwardly extending side edges 328 of the end hook 34. In one embodiment, the burred portions 348 are disposed on the laterally extending lower edge 330 of the end hook 34. In one embodiment, the burred portions 348 are disposed on the portions of the end hook 34 beyond the curvature of the blade 16.

In one embodiment, as shown in FIG. 12, the burred portions 348 project inwardly towards the tape rule body (to the right in FIG. 12) from the peripheral edge portions of the end hook 34. For example, the burred portions 348 may extend from the top portions 351 of inner surface 349 of the hook member 34 (adjacent the uppermost edges or surfaces 338). In addition (or alternatively), the burred portions 348 may be adjacent side edges 328 and extend from portions of the inner surface 349 that are near or adjacent side edges 328 of the end hook 34. Furthermore, the burred portions may alternatively or additionally be formed adjacent the bottom or lower edge 330 of the hook member 34 and extend inwardly toward the tape rule housing side of the hook member 34 (to the right in FIG. 12 as shown). In one embodiment, these burred portions (e.g., an area of roughness) 348 are formed during a stamping operation of the end hook 34. In other words, after the stamping operation, the peripheral edges of the end hook member 34 are not de-burred, leaving burrs 348 intact to provide a gripping attribute to the edges of the hook member 34.

Figure 13A:
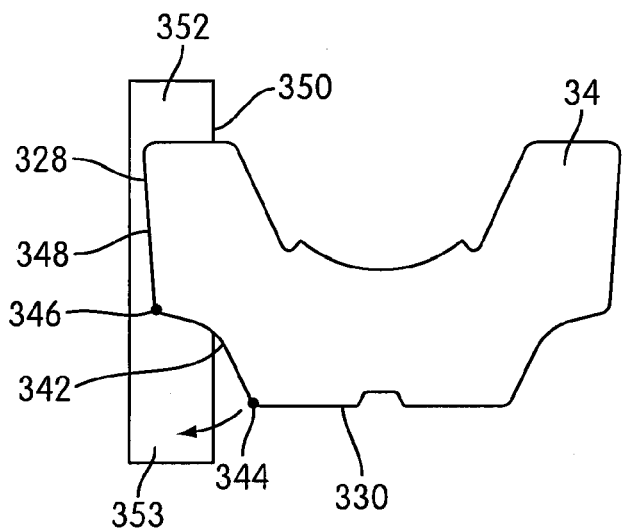
FIGS. 13A-C show the procedures involved while the end hook engages with a work-piece having a large radius in accordance with an embodiment of the present invention.
Figure 13B:
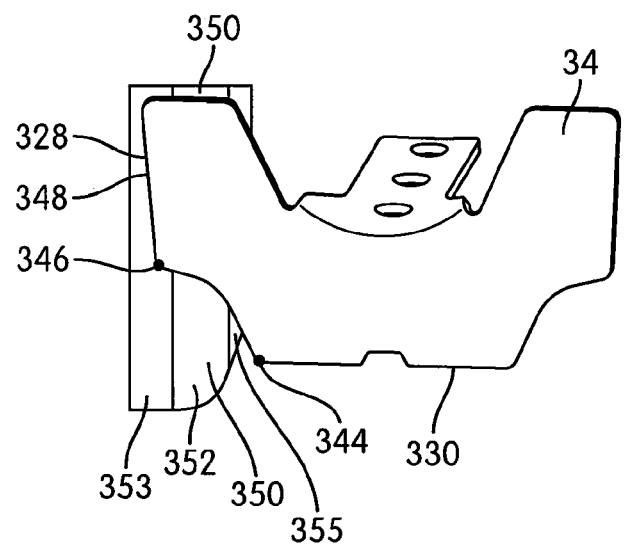
Figure 13C:
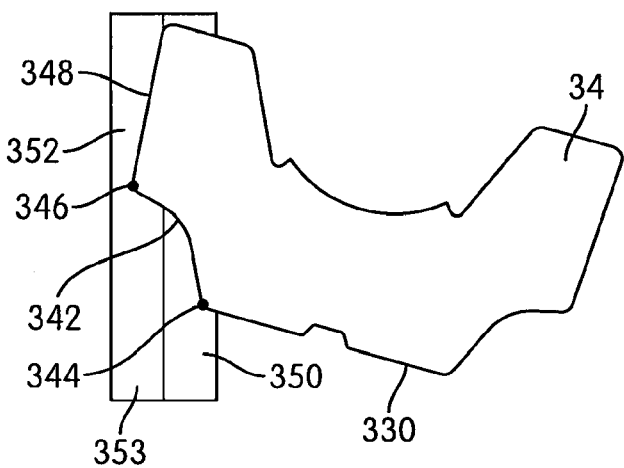

In one embodiment, the recessed edge portions 342 are constructed and arranged, as shown in FIG. 13C, such that when the end hook member 34 hookingly engages with a work-piece with a large radius, the recessed edge portions 342 are constructed and arranged to engage with curved surface portions 350 of the work-piece 352.

FIGS. 13A-C show the end hook member 34 of the extended blade 16 engaging with a work-piece 352 having two perpendicular, planar surface portions 353 and 355 with a curved (i.e., with a large radius) surface portion 350 at an interface therebetween. As shown in FIG. 13A, first the burred portions 348 disposed on the inner surface 349 adjacent the side edge 328 of the end hook member 34 are brought into contact with the planar surface portion 353 of the work-piece 352. As shown in FIGS. 13A and 13B, when the side burred portions 348 disposed on the inner surface 349 adjacent the side edge 328 of the end hook member 34 come in contact with the planar surface portion 353 of the work-piece 352, the end hook member 34 is constructed and arranged to rotate (as the blade 16 twists slightly) until the corner point (or the first point) 344 disposed at the intersection of the laterally extending lower edge 330 and the curved or recess edge portion 342 contacts the curved surface 350 or planar surface 355 of the work-piece 352, thus, stabilizing the end hook member 34. FIG. 13C shows the end hook member 34 in a stable configuration, where the recessed edge portions 342 of the end hook member 34 engage with the curved surface portion 350 of the work-piece 352, while the second point 346 (at the intersection between the curved or recess edge portion 342 and the side edge 328) disposed at the end of the upwardly extending side edge 328 is still in contact with the planar surface portion 353 of the work-piece 352. Thus, the second point 346 contacts the first planar surface 353, while curved edge 342 of the end hook 34 lies adjacent to the curved surface 350 of the work piece, and the first point 344 contacts a portion of the curved surface 350 or planar surface 355. During this operation, the lower portion of the end hook 34 is disposed slightly more closely to the tape rule housing (the hook member 34 is disposed at a slight angle)

Figure 10:
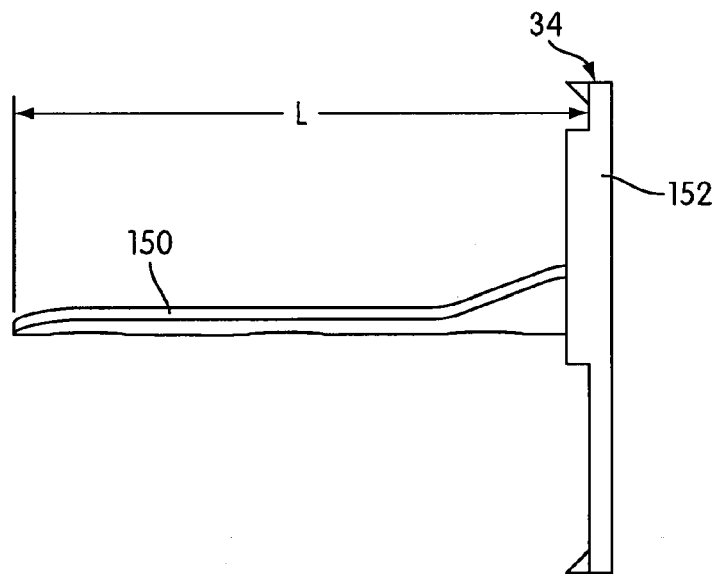
FIG. 10 shows a side perspective view of the end hook in accordance with an embodiment of the present invention.

In one embodiment, as shown in FIGS. 7 and 10, the mounting portion 150 has a length dimension L, and the hook portion 152 has a width dimension W. In one embodiment, to increase side catching capability of the end hook 34 while limiting weight of the end hook 34, the width dimension W of the hook portion 152 (i.e., face of the end hook 34) is larger than the length L of the mounting portion 150 (i.e., shank of the end hook 34). That is, in one embodiment, a ratio of the width dimension W of the hook portion 152 to the length dimension L of the mounting portion 150 is greater than or equal to 1.

In one embodiment, as shown in FIGS. 7 and 11, the mounting portion 150 has a top surface area TA, and the hook portion 152 has a front surface area FA. In one embodiment, to increase side catching capability of the end hook 34 while limiting weight of the end hook 34, the front surface area FA of the hook portion 152 (i.e., face of the end hook 34) is made larger than top surface area TA of the mounting portion 150 (i.e., shank of the end hook 34). That is, in one embodiment, a ratio of the front surface area FA of the hook portion 152 to the top surface area TA of the mounting portion 150 is greater than or equal to 1.1. Also, because the thickness of the metal is approximately uniform, the ratio of the weight of the hook portion 152 to the mounting portion 150 is similarly greater than or equal to 1.1.

As noted above, the mass of the mounting portion 150 (i.e., shank) of the end hook 34 is limited by having a ratio of the front surface area FA of the hook portion 152 to the top surface area TA of the mounting portion 150 is greater than or equal to 1.1 and/or a ratio of the width dimension W of the hook portion 152 to the length dimension L of the mounting portion 150 is greater than or equal to 1.

Figure 14:
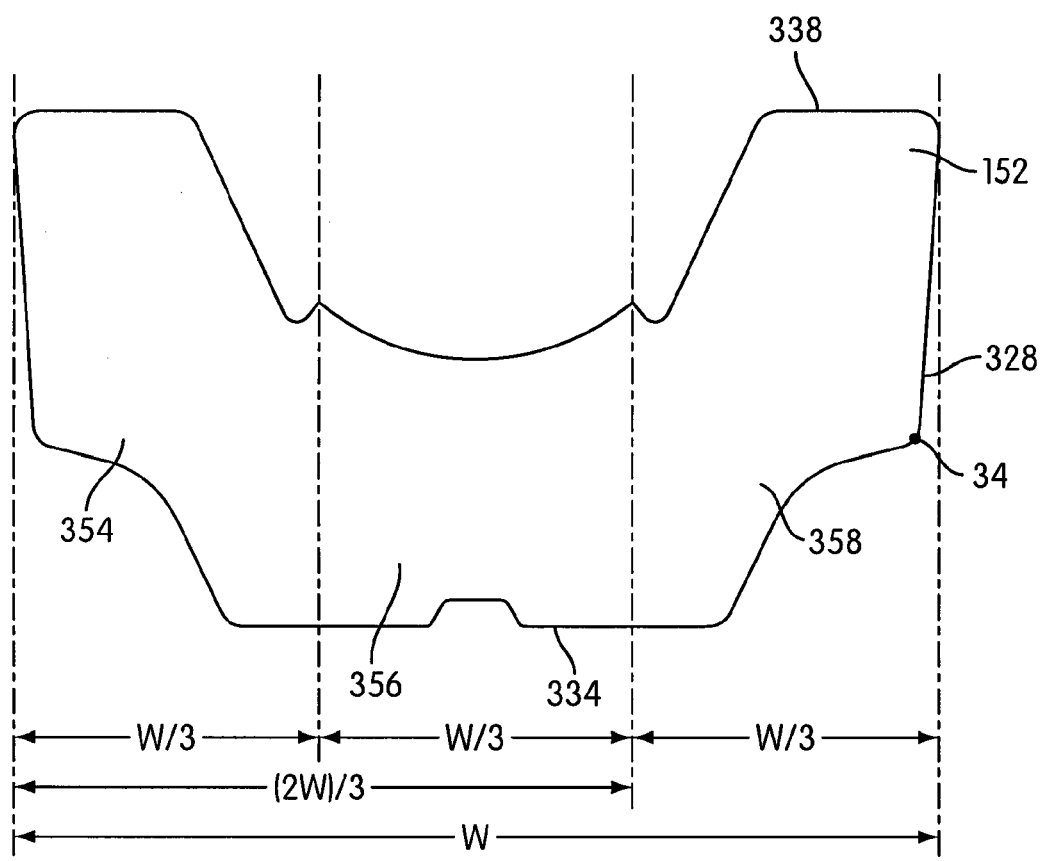
FIG. 14 shows a front view of the end hook, where two-thirds of the mass of hook portion of the end hook lies outside a center section that comprises one-third of the hook portion's width in accordance with an embodiment of the present invention.

In one embodiment, as shown in FIG. 14, if the hook portion's width W is divided into three equal length sections 354, 356, and 358, at least two-thirds of the mass of the hook portion 152 lies outside a center section 356 that comprises one third of the hook portion's width. More specifically, in one embodiment, as shown in FIG. 14, the hook portion 152 may include a central section 356, and opposing side sections 354 and 358 on opposite sides of the central section. The sections 354, 356 and 358 each include a width dimension that is equal to one-third of the width dimension W of the hook portion 152. In one embodiment, at least two-thirds of the mass of the hook portion 152 lies outside the central one third of the width of the hook portion 152 (i.e., face) of the end hook 34.

In one embodiment, by moving additional mass of the end hook 34 outboard of the central axis of the end hook 34, the end hook 34 acts as a stabilizer. This construction of the end hook 34 (i.e., where two-thirds of the mass of the hook portion 152 lies outside the center section 356) reduces roll of the blade 16 when the blade 16 is extended from the housing 12. This is achieved because the moment of rotational inertia of the end hook 34 is increased. In one embodiment, the moment of inertia of the end hook 34 is taken with respect to a plane in which the hook portion 152 of the end hook 34 lies. By increasing the overall inertia of the end hook 34, in relation to the axis of rotation that runs parallel to the blade length, the rule assembly 10 is stabilized. This gives the user a more stable rule assembly 10 and more opportunity to "recover and adjust" if the blade 16 begins to roll.

Figure 17:
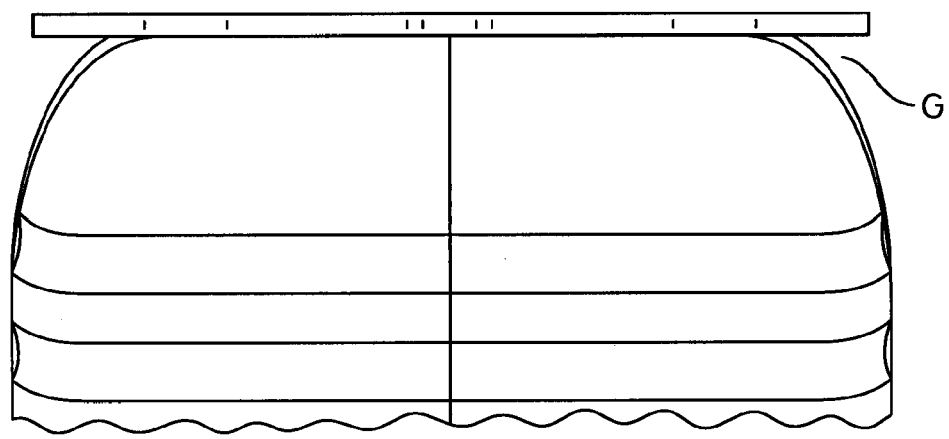
FIG. 17 shows a bottom plan view of the rule assembly, where a gap is located behind upwardly extending side edges of the hook portion of the end hook in accordance with an embodiment of the present invention.
Figure 18:
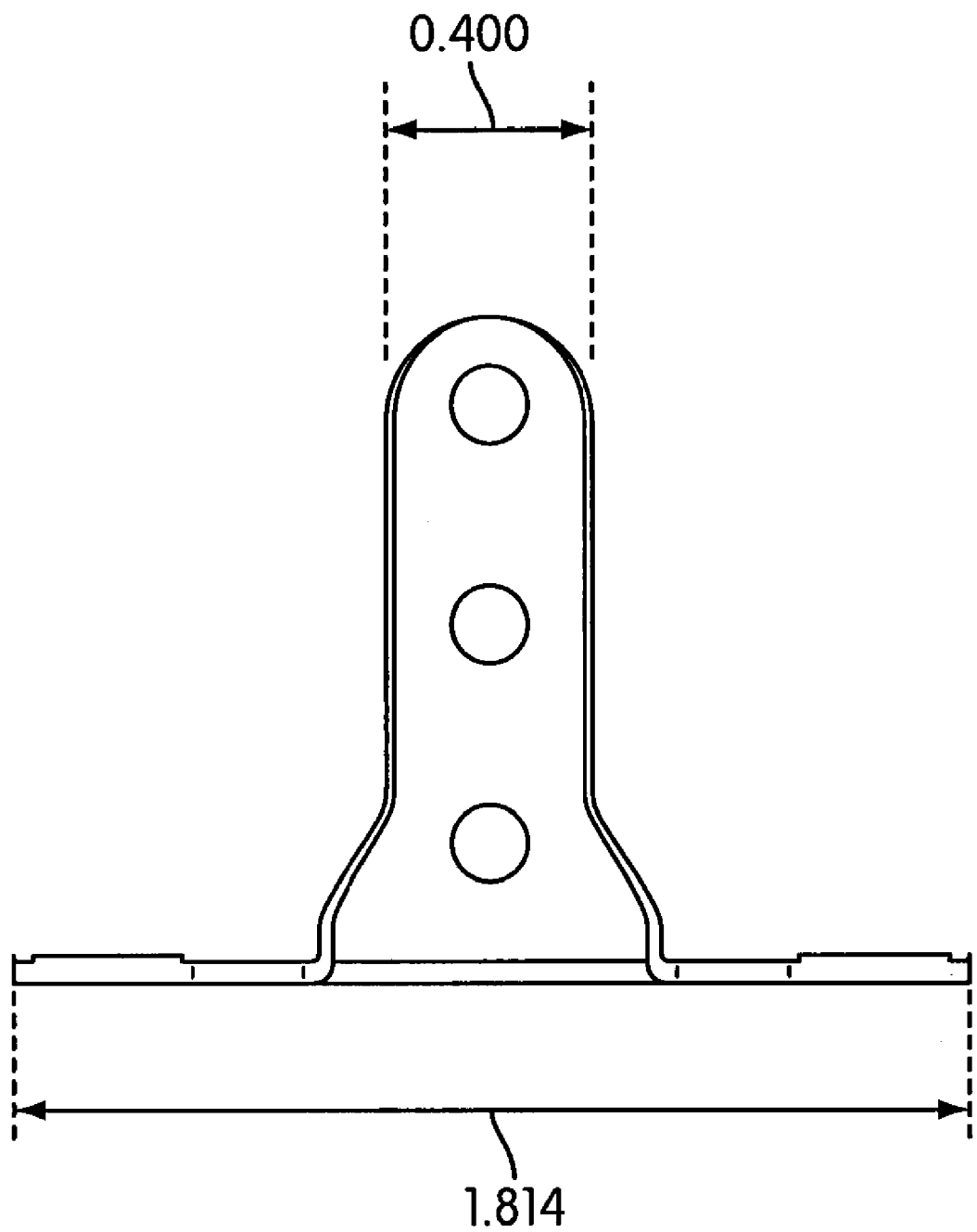
FIGS. 18-22 show portions and dimensions of various parts of an exemplary end hook in accordance with an embodiment of the present invention.
Figure 19:
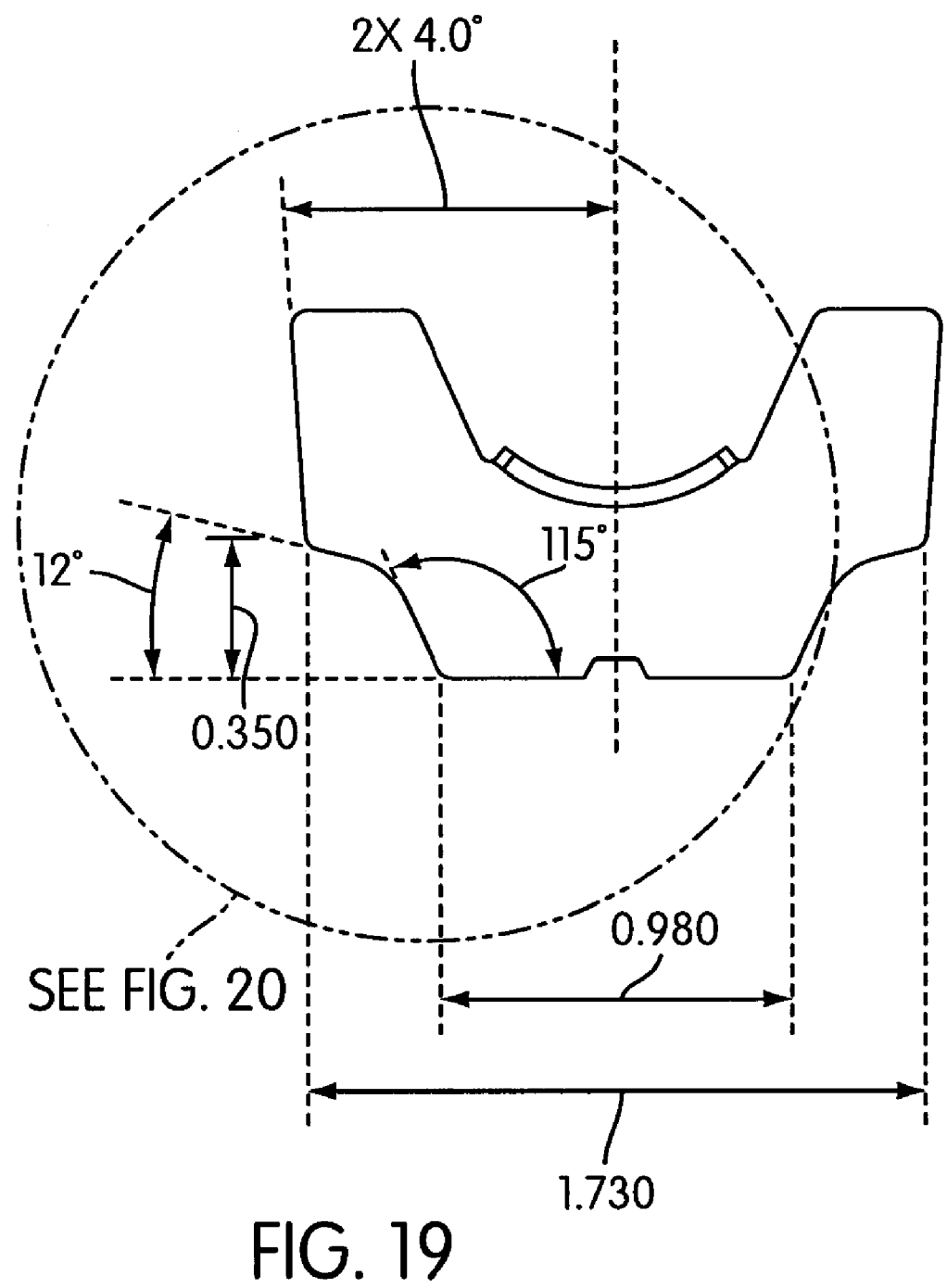
Figure 20:
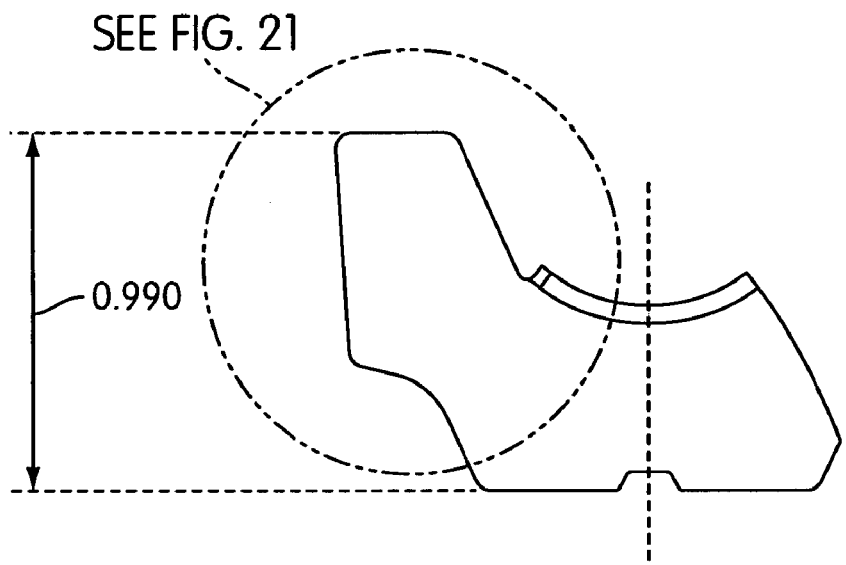

When the blade 16 is fully retracted into the housing 12 (as shown in FIGS. 1, 3 and 4), the blade 16 may be extracted by pulling the hook member 36 from behind the lower edge 330 (i.e., below the blade 16) of the hook member 34. In one embodiment, the end hook 34 gives the user access to extract the hook member 34 from behind the side edges 328 as well. For example, in one embodiment, when the blade 16 is fully retracted into the housing 12 (as shown in FIGS. 1, 3 and 4), a gap G (as shown in FIG. 17) is located behind the upwardly extending side edges 328 of the end hook 34. In other words, in one embodiment, when the end hook member 34 rests against the housing 12, the rear portions of the end hook member 34 immediately behind side edges 328 are free and do not rest or abut against the housing 12. This gap G (as shown in FIG. 17) located behind the upwardly extending side edges 328 of the hook portion 152 of the end hook 34 allows the user to extract the blade 16 along the side edges 328 of the hook member 34. In such embodiment, the blade 16 may be extracted by the user by inserting a finger in the gap G (as shown in FIG. 17) located behind the upwardly extending side edges 328 of the hook portion 152 of the end hook member 34.

As can be appreciated from FIG. 17, the housing tapers, so as to have a tapered region 391, as it transitions from the side surfaces 393 to the front surface 397 at a region near the opening in the housing that receives the tape rule blade. The tapered region 391 narrows the width of the housing as it approaches the opening 22 in the housing so that the hook is wider than the housing at a region where the hook portion abuts the housing and/or near the opening. As shown, the housing may be wider than the end hook 34 at regions spaced from the opening 22. This is one possible construction for forming the gap G, but other configurations are also possible.

In one embodiment, the end hook may be formed from various types of steel material. For example, in one embodiment, the end hook is formed from high carbon steels.

Figure 21:
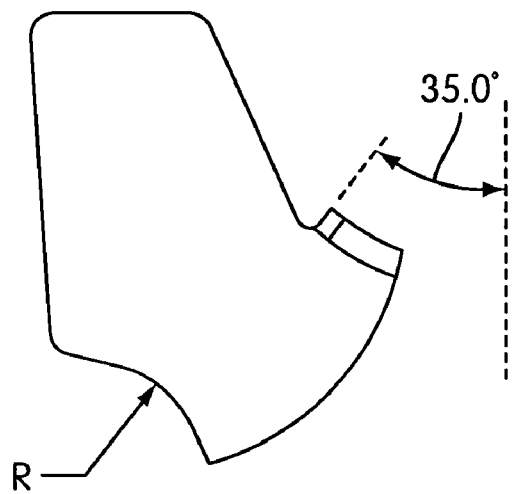
Figure 22:
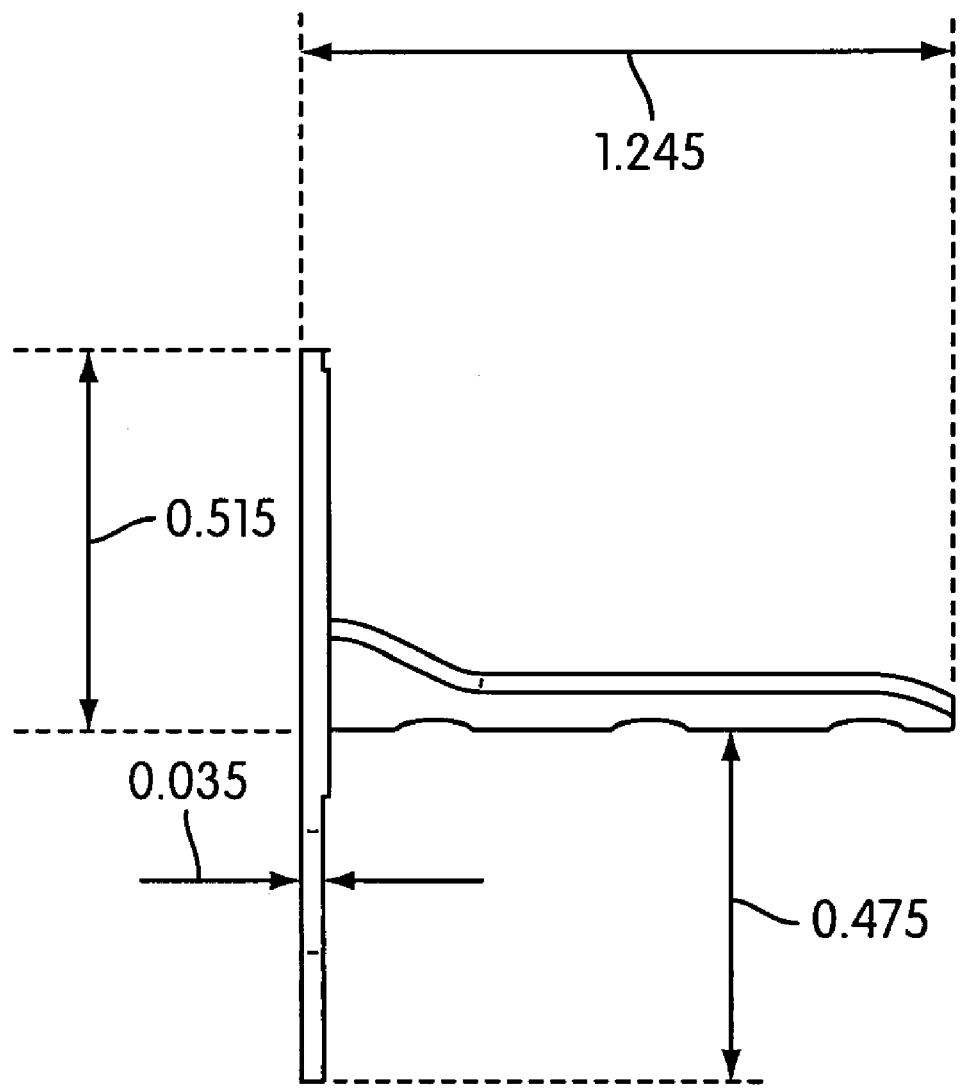

FIGS. 18-22 show portions and dimensions of various parts of the end hook in accordance with an embodiment of the present invention. The portions and dimensions of various parts of the end hook shown in FIGS. 18-22 are intended to be merely exemplary and not limiting in any way. The various parts of the end hook shown in FIGS. 18-22 are drawn to scale in accordance with one embodiment, although other scales and shapes may be used in other embodiments. The dimensions of various parts of the end hook as shown in FIGS. 18-22 are measured in inches unless indicated otherwise. In one embodiment, the dimensions of various parts of the end hook, as shown in FIGS. 18-22, are up to 10 percent greater than or up to 10 percent less than those illustrated. In another embodiment, the dimensions of various parts of the end hook, as shown in FIGS. 18-22, are up to 5 percent greater than or up to 5 percent less than those illustrated. FIG. 21 illustrates a radius R of the recessed edge portions 342. In one embodiment, a non-limiting range for the radius R of the recessed edge portions 342 is between 0.03 to 0.4 inches.

The aspects described above of the end hook including the extra top catch and side catch capabilities, burrs in multiple orientations, recessed edge portions, a ratio of the front surface area of the hook portion to the top surface area of the mounting portion is greater than or equal to 1.1, a ratio of the width dimension of the hook portion to the length dimension of the mounting portion is greater than or equal to 1, two-thirds of the mass of the hook portion lies outside a center section that comprises one third of the hook portion's width, at least half of the mass of the hook portion lies above the elongated blade, and/or an overall width dimension of the hook portion of the end hook is greater than the width dimension of the housing near the opening in the housing from where the elongated blade extends can be used separately or in combination with one another.

Similarly, the general teachings of the dimensions and/or construction of the housing, for example, lower corner portions of the housing are constructed and arranged to extend beyond the recessed edge portions of the end hook member can be used separately or in combination with any other aspect.

One skilled in the art will understand that the embodiment of the rule assembly 10 shown in the figures and described above is exemplary only and not intended to be limiting. It is within the scope of the invention to provide any known rule assembly with any or all of the features of the present invention. For example, the end hook constructed according to the principles of the present invention can be applied to any known rule assembly.

Although the invention has been described in detail for the purpose of illustration, it is to be understood that such detail is solely for that purpose and that the invention is not limited to the disclosed embodiments, but, on the contrary, is intended to cover modifications and equivalent arrangements that are within the spirit and scope of the appended claims. In addition, it is to be understood that the present invention contemplates that, to the extent possible, one or more features of any embodiment can be combined with one or more features of any other embodiment.

What is claimed is:

1. A rule assembly comprising:
   a housing;
   a reel rotatably mounted in the housing;
   an elongated blade arranged to be wound on the reel and to be extendable through an opening in the housing, the elongated blade having an end hook member on a free end thereof;
   the end hook member including a mounting portion and a generally U-shaped hook portion extending from an end of the mounting portion,
   the mounting portion having a length dimension, and the hook portion having a width dimension;
   wherein a ratio of the width dimension of the hook portion to the length dimension of the mounting portion is greater than or equal to 1.

2. The rule assembly of claim 1, wherein the mounting portion has a generally concavo-convex configuration.

3. The rule assembly of claim 1, wherein the U-shaped hook portion including a bight section and spaced leg sections extending upwardly from the bight section, the leg sections extending laterally beyond transversely spaced corners of the free end of the blade and upwardly above both the mounting portion and the spaced corners of the free end of the blade.

4. A rule assembly comprising:
   a housing;
   a reel rotatably mounted in the housing;
   an elongated blade arranged to be wound on the reel and to be extendable through an opening in the housing, the elongated blade having an end hook member on a free end thereof;
   the end hook member including a mounting portion and a generally U-shaped hook portion extending from an end of the mounting portion,
   the mounting portion having a top surface area, and the hook portion having a front surface area;
   wherein a ratio of the front surface area of the hook portion to the top surface area of the mounting portion is greater than or equal to 1.1.

5. The rule assembly of claim 4, wherein the hook portion including a bight section and spaced leg sections extending upwardly from the bight section, the leg sections extending laterally beyond transversely spaced corners of the free end of the blade and upwardly above both the mounting portion and the spaced corners of the free end of the blade.

6. The rule assembly of claim 4, wherein the mounting portion having a length dimension and the hook portion having a width dimension, and a ratio of the width dimension of the hook portion to the length dimension of the mounting portion is greater than or equal to 1.

7. The rule assembly of claim 4, wherein the mounting portion has a generally concavo-convex configuration.

8. A rule assembly comprising:
a housing;
a reel rotatably mounted in the housing;
an elongated blade arranged to be wound on the reel and to be extendable through an opening in the housing, the elongated blade having an end hook member on a free end thereof;
the end hook member including a mounting portion and a hook portion extending from an end of the mounting portion,
wherein at least two-thirds of the mass of the hook portion lies outside a center section that comprises one third of the hook portion's width.

9. The rule assembly of claim 8, wherein the hook portion has a generally U-shaped configuration.

10. The rule assembly of claim 8, wherein the mounting portion having a length dimension and the hook portion having a width dimension, and a ratio of the width dimension of the hook portion to the length dimension of the mounting portion is greater than or equal to 1.

11. The rule assembly of claim 8, wherein the hook portion including a bight section and spaced leg sections extending upwardly from the bight section, the leg sections extending laterally beyond transversely spaced corners of the free end of the blade and upwardly above both the mounting portion and the spaced corners of the free end of the blade.

12. The rule assembly of claim 8, wherein the mounting portion has a generally concavo-convex configuration.

13. A rule assembly comprising:
a housing;
a reel mounted in the housing for rotation about an axis;
an elongated blade arranged to be wound on the reel and to be extendable through an opening in the housing, the elongated blade having an end hook member on a free end thereof;
the end hook member including a mounting portion and a hook portion extending from an end of the mounting portion,
wherein the housing has a width dimension along the axis that is larger than a width dimension of the housing near the opening in the housing from where the elongated blade extends, and
wherein a width dimension of the hook portion of the end hook is greater than the width dimension of the housing near the opening in the housing from where the elongated blade extends.

14. The rule assembly of claim 13, further comprising a gap located behind the upwardly extending side edges of the hook portion of the end hook, when the blade is fully retracted into the housing.

15. The rule assembly of claim 13, wherein the hook portion including a bight section and spaced leg sections extending upwardly from the bight section, the leg sections extending laterally beyond transversely spaced corners of the free end of the blade and upwardly above both the mounting portion and the spaced corners of the free end of the blade.

16. The rule assembly of claim 13, wherein the width dimension of the hook portion is less than the width dimension of the housing along the axis.

17. The rule assembly of claim 14, wherein the housing has a tapered portion at a region adjacent to where the hook portion abuts the housing so as to form the gap.

18. The rule assembly of claim 13, wherein the hook portion has a generally U-shaped configuration.

19. The rule assembly of claim 13, wherein the mounting portion having a length dimension, and a ratio of the width dimension of the hook portion to the length dimension of the mounting portion is greater than or equal to 1.

20. The rule assembly of claim 13, wherein the mounting portion has a generally concavo-convex configuration.

21. A rule assembly comprising:
a housing;
a reel rotatably mounted in the housing;
an elongated blade arranged to be wound on the reel and to be extendable through an opening in the housing, the elongated blade having an end hook member on a free end thereof;
the end hook member including a mounting portion and a hook portion extending from an end of the mounting portion,
wherein at least half of the mass of the hook portion lies above the mounting portion of the end hook member.

22. The rule assembly of claim 21, wherein the hook portion includes a bight section and spaced leg sections extending upwardly from the bight section, the leg sections extending laterally beyond transversely spaced corners of the free end of the blade and upwardly above both the mounting portion and the spaced corners of the free end of the blade.

23. The rule assembly of claim 21, wherein the hook portion has a generally U-shaped configuration.

24. The rule assembly of claim 21, wherein the mounting portion having a length dimension, and a ratio of the width dimension of the hook portion to the length dimension of the mounting portion is greater than or equal to 1.

25. The rule assembly of claim 21, wherein the mounting portion has a generally concavo-convex configuration.

* * * * *